US008885688B2

(12) United States Patent
Gainey et al.

(10) Patent No.: US 8,885,688 B2
(45) Date of Patent: Nov. 11, 2014

(54) CONTROL MESSAGE MANAGEMENT IN PHYSICAL LAYER REPEATER

(75) Inventors: Kenneth M. Gainey, Satellite Beach, FL (US); James A. Proctor, Jr., Melbourne Beach, FL (US); Ross L. Lintelman, Indialantic, FL (US); Lawrence W. LaMont, Jr., Indialantic, FL (US); Carlos M. Puig, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2154 days.

(21) Appl. No.: 11/448,155

(22) Filed: Jun. 7, 2006

(65) Prior Publication Data

US 2007/0025486 A1    Feb. 1, 2007

Related U.S. Application Data

(63) Continuation-in-part of application No. 10/531,077, filed as application No. PCT/US03/31515 on Oct. 24,
(Continued)

(51) Int. Cl.
  *H04B 3/36* (2006.01)
  *H04B 7/14* (2006.01)
  *H04L 25/60* (2006.01)

(52) U.S. Cl.
  USPC ........... 375/211; 375/214; 375/219; 375/316; 375/295; 370/293; 370/315

(58) Field of Classification Search
  USPC .................. 375/219–222, 295, 211, 214, 375/240.26–240.27, 284, 285, 316, 375/340–341, 302–315; 370/282, 293, 315, 370/329, 432, 492, 501
  See application file for complete search history.

(56) References Cited

U.S. PATENT DOCUMENTS 3,363,250 A   1/1968   Jacobson
4,000,467 A   12/1976  Lentz et al.
(Continued)

FOREIGN PATENT DOCUMENTS

CA    2051283 A1   3/1992
CN    1137335 A    12/1996
(Continued)

OTHER PUBLICATIONS

International Preliminary Report on Patentability dated Dec. 11, 2007 in corresponding patent application No. PCT/US2006/022075.
(Continued)

*Primary Examiner* — Sam K Ahn
*Assistant Examiner* — Linda Wong
(74) *Attorney, Agent, or Firm* — Thien T. Nguyen (57) ABSTRACT

A repeater is configured to selectively generate and transmit control message packets between wireless stations on both a transmit side and a receive side of the repeater. The repeater manages and manipulates an end to end protocol of the control message packets in a manner that does not change media access control (MAC) addresses of the end to end protocol so as to achieve a network objective, such as preventing other transmitters from transmitting while the repeater repeats a signal from its receive side to its transmit side. The control message management is applicable to analog signal repeaters as well as digital repeaters, such as symbol to symbol or packet to packet repeaters, in which physical layer control message management is performed.

42 Claims, 4 Drawing Sheets

Related U.S. Application Data 2003, application No. 11/448,155, which is a continuation-in-part of application No. 10/536,471, filed as application No. PCT/US03/39889 on Dec. 16, 2003, now Pat. No. 7,990,904, application No. 11/448,155, which is a continuation-in-part of application No. 10/529,037, filed as application No. PCT/US03/28558 on Oct. 1, 2003, now Pat. No. 7,200,134.

(60) Provisional application No. 60/687,890, filed on Jun. 7, 2005, provisional application No. 60/420,449, filed on Oct. 24, 2002, provisional application No. 60/433,171, filed on Dec. 16, 2002, provisional application No. 60/414,888, filed on Oct. 1, 2002.

(56) References Cited

U.S. PATENT DOCUMENTS

| | | | | |
|---|---|---|---|---|
| 4,001,691 | A | 1/1977 | Gruenberg et al. | |
| 4,061,970 | A | 12/1977 | Magneron et al. | |
| 4,081,752 | A | 3/1978 | Sumi et al. | |
| 4,124,825 | A | 11/1978 | Webb et al. | |
| 4,204,016 | A | 5/1980 | Chavannes et al. | |
| 4,334,323 | A | 6/1982 | Moore et al. | |
| 4,368,541 | A | 1/1983 | Evans et al. | |
| 4,509,206 | A | 4/1985 | Carpe et al. | |
| 4,679,243 | A | 7/1987 | McGeehan et al. | |
| 4,701,935 | A * | 10/1987 | Namiki | 375/214 |
| 4,723,302 | A | 2/1988 | Fulmer et al. | |
| 4,777,653 | A | 10/1988 | Bonnerot et al. | |
| 4,783,843 | A | 11/1988 | Leff et al. | |
| 4,820,568 | A | 4/1989 | Harpell et al. | |
| 4,922,259 | A | 5/1990 | Hall et al. | |
| 5,023,930 | A | 6/1991 | Leslie et al. | |
| 5,095,528 | A | 3/1992 | Leslie et al. | |
| 5,214,788 | A | 5/1993 | Delaperriere et al. | |
| 5,220,562 | A * | 6/1993 | Takada et al. | 370/404 |
| 5,280,480 | A | 1/1994 | Pitt et al. | |
| 5,333,175 | A | 7/1994 | Ariyavisitakul et al. | |
| 5,341,364 | A | 8/1994 | Marra et al. | |
| 5,349,463 | A | 9/1994 | Hirohashi et al. | |
| 5,368,897 | A | 11/1994 | Kurihara et al. | |
| 5,371,734 | A | 12/1994 | Fischer et al. | |
| 5,373,503 | A | 12/1994 | Chen et al. | |
| 5,383,144 | A | 1/1995 | Kato | |
| 5,408,197 | A | 4/1995 | Miyake et al. | |
| 5,408,618 | A | 4/1995 | Aho et al. | |
| 5,430,726 | A | 7/1995 | Moorwood et al. | |
| 5,446,770 | A | 8/1995 | Urabe et al. | |
| 5,465,251 | A | 11/1995 | Judd et al. | |
| 5,471,642 | A | 11/1995 | Palmer et al. | |
| 5,485,486 | A | 1/1996 | Gilhousen et al. | |
| 5,509,028 | A | 4/1996 | Marque-Pucheu et al. | |
| 5,515,376 | A | 5/1996 | Murthy et al. | |
| 5,519,619 | A | 5/1996 | Seda et al. | |
| 5,608,755 | A | 3/1997 | Rakib et al. | |
| 5,610,916 | A | 3/1997 | Kostreski et al. | |
| 5,648,984 | A | 7/1997 | Kroninger et al. | |
| 5,654,979 | A | 8/1997 | Levin et al. | |
| 5,659,879 | A | 8/1997 | Dupuy et al. | |
| 5,678,177 | A | 10/1997 | Beasley et al. | |
| 5,678,198 | A | 10/1997 | Lemson et al. | |
| 5,684,801 | A | 11/1997 | Amitay et al. | |
| 5,697,052 | A | 12/1997 | Treatch et al. | |
| 5,726,980 | A | 3/1998 | Rickard et al. | |
| 5,732,334 | A | 3/1998 | Miyake et al. | |
| 5,745,846 | A | 4/1998 | Myer et al. | |
| 5,754,540 | A | 5/1998 | Liu et al. | |
| 5,764,636 | A | 6/1998 | Edsall et al. | |
| 5,767,788 | A | 6/1998 | Ness | |
| 5,771,174 | A | 6/1998 | Spinner et al. | |
| 5,784,683 | A | 7/1998 | Sistanizadeh et al. | |
| 5,794,145 | A | 8/1998 | Milam et al. | |
| 5,812,933 | A | 9/1998 | Niki et al. | |
| 5,815,795 | A | 9/1998 | Iwai et al. | |
| 5,825,809 | A | 10/1998 | Sim | |
| 5,852,629 | A | 12/1998 | Iwamatsu et al. | |
| 5,857,144 | A | 1/1999 | Mangum et al. | |
| 5,862,207 | A | 1/1999 | Aoshima et al. | |
| 5,875,179 | A | 2/1999 | Tikalsky et al. | |
| 5,883,884 | A | 3/1999 | Atkinson et al. | |
| 5,884,181 | A | 3/1999 | Arnold et al. | |
| 5,890,055 | A | 3/1999 | Chu et al. | |
| 5,903,553 | A | 5/1999 | Sakamoto et al. | |
| 5,907,794 | A | 5/1999 | Lehmusto et al. | |
| 5,963,846 | A | 10/1999 | Kurby et al. | |
| 5,963,847 | A | 10/1999 | Ito et al. | |
| 5,987,304 | A | 11/1999 | Latt et al. | |
| 6,005,855 | A * | 12/1999 | Zehavi et al. | 370/335 |
| 6,005,884 | A | 12/1999 | Cook et al. | |
| 6,014,380 | A | 1/2000 | Hendel et al. | |
| 6,032,194 | A | 2/2000 | Gai et al. | |
| 6,061,548 | A | 5/2000 | Reudink et al. | |
| 6,088,570 | A | 7/2000 | Komara et al. | |
| 6,101,400 | A | 8/2000 | Ogaz et al. | |
| 6,108,364 | A | 8/2000 | Weaver, Jr. et al. | |
| 6,128,512 | A | 10/2000 | Trompower et al. | |
| 6,128,729 | A | 10/2000 | Kimball et al. | |
| 6,141,335 | A | 10/2000 | Kuwahara et al. | |
| 6,163,276 | A | 12/2000 | Irving et al. | |
| 6,188,694 | B1 | 2/2001 | Fine et al. | |
| 6,188,719 | B1 | 2/2001 | Collomby et al. | |
| 6,195,051 | B1 | 2/2001 | McCoy et al. | |
| 6,202,114 | B1 | 3/2001 | Dutt et al. | |
| 6,215,982 | B1 | 4/2001 | Trompower et al. | |
| 6,219,739 | B1 | 4/2001 | Dutt et al. | |
| 6,222,503 | B1 | 4/2001 | Gietema et al. | |
| 6,272,351 | B1 | 8/2001 | Langston et al. | |
| 6,285,863 | B1 | 9/2001 | Zhang | |
| 6,298,061 | B1 | 10/2001 | Chin et al. | |
| 6,304,563 | B1 | 10/2001 | Blessent et al. | |
| 6,304,575 | B1 | 10/2001 | Carroll et al. | |
| 6,331,792 | B1 | 12/2001 | Tonietto et al. | |
| 6,339,694 | B1 | 1/2002 | Komara et al. | |
| 6,342,777 | B1 | 1/2002 | Takahashi et al. | |
| 6,363,068 | B1 | 3/2002 | Kinoshita et al. | |
| 6,370,185 | B1 | 4/2002 | Schmutz et al. | |
| 6,370,369 | B1 | 4/2002 | Kraiem et al. | |
| 6,377,612 | B1 | 4/2002 | Baker et al. | |
| 6,377,640 | B2 | 4/2002 | Trans et al. | |
| 6,384,765 | B1 | 5/2002 | Sjostrand et al. | |
| 6,385,181 | B1 | 5/2002 | Tsutsui et al. | |
| 6,388,995 | B1 | 5/2002 | Gai et al. | |
| 6,393,299 | B1 | 5/2002 | Mizumoto et al. | |
| 6,404,775 | B1 * | 6/2002 | Leslie et al. | 370/466 |
| 6,441,781 | B1 | 8/2002 | Rog et al. | |
| 6,473,131 | B1 | 10/2002 | Neugebauer et al. | |
| 6,480,481 | B1 * | 11/2002 | Park et al. | 370/342 |
| 6,498,804 | B1 | 12/2002 | Ide et al. | |
| 6,501,955 | B1 | 12/2002 | Durrant et al. | |
| 6,516,438 | B1 * | 2/2003 | Wilcoxson et al. | 714/755 |
| 6,535,732 | B1 | 3/2003 | McIntosh et al. | |
| 6,539,028 | B1 * | 3/2003 | Soh et al. | 370/445 |
| 6,549,542 | B1 * | 4/2003 | Dong et al. | 370/441 |
| 6,549,567 | B1 | 4/2003 | Fullerton et al. | |
| 6,563,468 | B2 | 5/2003 | Hill et al. | |
| 6,574,198 | B1 | 6/2003 | Petersson et al. | |
| 6,628,624 | B1 | 9/2003 | Mahajan et al. | |
| 6,664,932 | B2 | 12/2003 | Sabet et al. | |
| 6,671,502 | B1 | 12/2003 | Ogawa et al. | |
| 6,684,058 | B1 | 1/2004 | Karacaoglu et al. | |
| 6,690,657 | B1 * | 2/2004 | Lau et al. | 370/315 |
| 6,694,125 | B2 * | 2/2004 | White et al. | 455/16 |
| 6,718,160 | B2 | 4/2004 | Schmutz et al. | |
| 6,728,541 | B2 | 4/2004 | Ohkura et al. | |
| 6,766,113 | B1 * | 7/2004 | Al-Salameh et al. | 398/30 |
| 6,781,544 | B2 | 8/2004 | Saliga et al. | |
| 6,788,256 | B2 | 9/2004 | Hollister | |
| 6,880,103 | B2 | 4/2005 | Kim et al. | |
| 6,888,809 | B1 | 5/2005 | Foschini et al. | |
| 6,888,881 | B1 | 5/2005 | Nagano | |
| 6,904,266 | B1 | 6/2005 | Jin et al. | |
| 6,906,669 | B2 | 6/2005 | Sabet et al. | |

(56) References Cited

U.S. PATENT DOCUMENTS

| | | | |
|---|---|---|---|
| 6,934,511 B1 | 8/2005 | Lovinggood et al. | |
| 6,934,555 B2 * | 8/2005 | Silva et al. | 455/522 |
| 6,944,139 B1 | 9/2005 | Campanella et al. | |
| 6,957,042 B2 | 10/2005 | Williams et al. | |
| 6,965,568 B1 | 11/2005 | Larsen | |
| 6,983,162 B2 | 1/2006 | Garani et al. | |
| 6,985,516 B1 | 1/2006 | Easton et al. | |
| 6,990,313 B1 | 1/2006 | Yarkosky et al. | |
| 7,027,418 B2 | 4/2006 | Gan et al. | |
| 7,027,770 B2 | 4/2006 | Judd et al. | |
| 7,043,203 B2 * | 5/2006 | Miquel et al. | 455/24 |
| 7,050,442 B1 | 5/2006 | Proctor et al. | |
| 7,050,452 B2 | 5/2006 | Sugar et al. | |
| 7,058,071 B1 * | 6/2006 | Myles et al. | 370/419 |
| 7,058,368 B2 | 6/2006 | Nicholls et al. | |
| 7,065,036 B1 * | 6/2006 | Ryan | 370/208 |
| 7,088,734 B2 | 8/2006 | Newberg et al. | |
| 7,103,344 B2 | 9/2006 | Menard et al. | |
| 7,120,930 B2 * | 10/2006 | Maufer et al. | 726/11 |
| 7,123,670 B2 * | 10/2006 | Gilbert et al. | 375/344 |
| 7,123,676 B2 | 10/2006 | Gebara et al. | |
| 7,132,988 B2 | 11/2006 | Yegin et al. | |
| 7,133,391 B2 | 11/2006 | Belcea | |
| 7,133,460 B2 * | 11/2006 | Bae et al. | 375/295 |
| 7,139,527 B2 | 11/2006 | Tamaki et al. | |
| 7,167,526 B2 | 1/2007 | Liang et al. | |
| 7,187,904 B2 | 3/2007 | Gainey et al. | |
| 7,193,975 B2 | 3/2007 | Tsutsumi et al. | |
| 7,194,275 B2 | 3/2007 | Bolin et al. | |
| 7,200,134 B2 | 4/2007 | Proctor, Jr. et al. | |
| 7,215,964 B2 | 5/2007 | Miyake et al. | |
| 7,233,771 B2 | 6/2007 | Proctor, Jr. et al. | |
| 7,248,645 B2 | 7/2007 | Vialle et al. | |
| 7,254,132 B2 | 8/2007 | Takao et al. | |
| 7,299,005 B1 | 11/2007 | Yarkosky et al. | |
| 7,315,573 B2 | 1/2008 | Lusky et al. | |
| 7,319,714 B2 | 1/2008 | Sakata et al. | |
| 7,321,787 B2 | 1/2008 | Kim et al. | |
| 7,339,926 B2 | 3/2008 | Stanwood et al. | |
| 7,352,696 B2 | 4/2008 | Stephens et al. | |
| 7,406,060 B2 | 7/2008 | Periyalwar et al. | |
| 7,409,186 B2 | 8/2008 | Van Buren et al. | |
| 7,430,397 B2 | 9/2008 | Suda et al. | |
| 7,450,936 B2 | 11/2008 | Kim et al. | |
| 7,457,587 B2 | 11/2008 | Chung | |
| 7,463,200 B2 | 12/2008 | Gainey et al. | |
| 7,486,929 B2 | 2/2009 | Van Buren et al. | |
| 7,577,398 B2 | 8/2009 | Judd et al. | |
| 7,590,145 B2 | 9/2009 | Futch et al. | |
| 7,623,826 B2 | 11/2009 | Pergal et al. | |
| 7,676,194 B2 | 3/2010 | Rappaport et al. | |
| 7,729,669 B2 | 6/2010 | Van Buren et al. | |
| 8,023,885 B2 | 9/2011 | Proctor, Jr. et al. | |
| 8,027,642 B2 | 9/2011 | Proctor, Jr. et al. | |
| 8,059,727 B2 | 11/2011 | Proctor, Jr. et al. | |
| 8,078,100 B2 | 12/2011 | Proctor, Jr. et al. | |
| 8,539,204 B2 | 9/2013 | Fahs et al. | |
| 8,559,379 B2 | 10/2013 | Gainey et al. | |
| 2001/0018328 A1 | 8/2001 | Ohkura et al. | |
| 2001/0028638 A1 * | 10/2001 | Walton et al. | 370/335 |
| 2001/0031646 A1 | 10/2001 | Williams et al. | |
| 2001/0040699 A1 | 11/2001 | Osawa et al. | |
| 2001/0050580 A1 | 12/2001 | O'toole et al. | |
| 2001/0050906 A1 * | 12/2001 | Odenwalder et al. | 370/329 |
| 2001/0054060 A1 | 12/2001 | Fillebrown et al. | |
| 2002/0004924 A1 * | 1/2002 | Kim et al. | 714/752 |
| 2002/0018479 A1 | 2/2002 | Kikkawa et al. | |
| 2002/0018487 A1 | 2/2002 | Chen et al. | |
| 2002/0034958 A1 | 3/2002 | Oberschmidt et al. | |
| 2002/0045461 A1 | 4/2002 | Bongfeldt et al. | |
| 2002/0061031 A1 | 5/2002 | Sugar et al. | |
| 2002/0072853 A1 * | 6/2002 | Sullivan | 701/213 |
| 2002/0089945 A1 | 7/2002 | Belcea et al. | |
| 2002/0101843 A1 | 8/2002 | Sheng et al. | |
| 2002/0102948 A1 * | 8/2002 | Stanwood et al. | 455/91 |
| 2002/0109585 A1 | 8/2002 | Sanderson et al. | |
| 2002/0115409 A1 | 8/2002 | Khayrallah et al. | |
| 2002/0119783 A1 | 8/2002 | Bourlas et al. | |
| 2002/0136268 A1 | 9/2002 | Gan et al. | |
| 2002/0141435 A1 | 10/2002 | Newberg et al. | |
| 2002/0146026 A1 | 10/2002 | Unitt et al. | |
| 2002/0155838 A1 | 10/2002 | Durrant et al. | |
| 2002/0159506 A1 | 10/2002 | Alamouti et al. | |
| 2002/0163902 A1 | 11/2002 | Takao et al. | |
| 2002/0177401 A1 | 11/2002 | Judd et al. | |
| 2003/0008669 A1 * | 1/2003 | Stein et al. | 455/456 |
| 2003/0026363 A1 | 2/2003 | Stoter et al. | |
| 2003/0063583 A1 * | 4/2003 | Padovani et al. | 370/329 |
| 2003/0124976 A1 | 7/2003 | Tamaki et al. | |
| 2003/0139175 A1 | 7/2003 | Kim et al. | |
| 2003/0148736 A1 | 8/2003 | Wright et al. | |
| 2003/0179734 A1 | 9/2003 | Tsutsumi et al. | |
| 2003/0185163 A1 | 10/2003 | Bertonis et al. | |
| 2003/0211828 A1 * | 11/2003 | Dalgleish et al. | 455/11.1 |
| 2003/0235170 A1 | 12/2003 | Trainin et al. | |
| 2003/0236069 A1 | 12/2003 | Sakata et al. | |
| 2004/0001464 A1 | 1/2004 | Adkins et al. | |
| 2004/0029537 A1 | 2/2004 | Pugel et al. | |
| 2004/0038707 A1 | 2/2004 | Kim et al. | |
| 2004/0047333 A1 | 3/2004 | Han et al. | |
| 2004/0047335 A1 | 3/2004 | Proctor, Jr. et al. | |
| 2004/0056802 A1 | 3/2004 | Hollister | |
| 2004/0110469 A1 | 6/2004 | Judd et al. | |
| 2004/0121648 A1 | 6/2004 | Voros | |
| 2004/0131025 A1 | 7/2004 | Dohler et al. | |
| 2004/0146013 A1 | 7/2004 | Song et al. | |
| 2004/0157551 A1 | 8/2004 | Gainey et al. | |
| 2004/0166802 A1 | 8/2004 | McKay, Sr. et al. | |
| 2004/0176050 A1 | 9/2004 | Steer et al. | |
| 2004/0198295 A1 | 10/2004 | Nicholls et al. | |
| 2004/0208258 A1 | 10/2004 | Lozano et al. | |
| 2004/0218683 A1 | 11/2004 | Batra et al. | |
| 2004/0229563 A1 | 11/2004 | Fitton et al. | |
| 2004/0235417 A1 | 11/2004 | Dean | |
| 2004/0240426 A1 | 12/2004 | Wu et al. | |
| 2004/0248581 A1 | 12/2004 | Seki et al. | |
| 2004/0264511 A1 | 12/2004 | Futch et al. | |
| 2005/0014464 A1 | 1/2005 | Larsson | |
| 2005/0030891 A1 | 2/2005 | Stephens et al. | |
| 2005/0042999 A1 | 2/2005 | Rappaport | |
| 2005/0130587 A1 | 6/2005 | Suda et al. | |
| 2005/0190822 A1 | 9/2005 | Fujii et al. | |
| 2005/0201315 A1 | 9/2005 | Lakkis et al. | |
| 2005/0254442 A1 | 11/2005 | Proctor, Jr. et al. | |
| 2005/0256963 A1 | 11/2005 | Proctor, Jr. et al. | |
| 2005/0286448 A1 | 12/2005 | Proctor et al. | |
| 2006/0028388 A1 | 2/2006 | Schantz | |
| 2006/0035643 A1 | 2/2006 | Vook et al. | |
| 2006/0040615 A1 | 2/2006 | Mohamadi | |
| 2006/0041680 A1 | 2/2006 | Proctor, Jr et al. | |
| 2006/0045193 A1 | 3/2006 | Stolpman et al. | |
| 2006/0052066 A1 | 3/2006 | Cleveland et al. | |
| 2006/0052099 A1 | 3/2006 | Parker et al. | |
| 2006/0056352 A1 | 3/2006 | Proctor et al. | |
| 2006/0063484 A1 | 3/2006 | Proctor et al. | |
| 2006/0063485 A1 | 3/2006 | Gainey et al. | |
| 2006/0067277 A1 | 3/2006 | Thomas et al. | |
| 2006/0072682 A1 | 4/2006 | Kent et al. | |
| 2006/0098592 A1 | 5/2006 | Proctor, Jr. et al. | |
| 2006/0183421 A1 | 8/2006 | Proctor et al. | |
| 2006/0203757 A1 | 9/2006 | Young et al. | |
| 2006/0262026 A1 | 11/2006 | Gainey et al. | |
| 2007/0025349 A1 | 2/2007 | Bajic | |
| 2007/0032192 A1 | 2/2007 | Gainey et al. | |
| 2007/0121546 A1 | 5/2007 | Zuckerman et al. | |
| 2007/0237181 A1 | 10/2007 | Cho et al. | |
| 2007/0268846 A1 | 11/2007 | Proctor et al. | |
| 2007/0286110 A1 | 12/2007 | Proctor, Jr. et al. | |
| 2008/0057862 A1 | 3/2008 | Smith et al. | |
| 2008/0232438 A1 | 9/2008 | Dai et al. | |
| 2008/0233942 A9 * | 9/2008 | Kim | 455/419 |
| 2008/0267156 A1 | 10/2008 | Gubeskys et al. | |
| 2009/0135745 A1 | 5/2009 | Gainey et al. | |
| 2009/0190684 A1 | 7/2009 | She et al. | |

(56) References Cited

U.S. PATENT DOCUMENTS

| | | | |
|---|---|---|---|
| 2009/0290526 A1 | 11/2009 | Gainey et al. | |
| 2009/0323582 A1 | 12/2009 | Proctor, Jr. et al. | |
| 2010/0002620 A1 | 1/2010 | Proctor, Jr. et al. | |

FOREIGN PATENT DOCUMENTS

| | | |
|---|---|---|
| CN | 1186401 A | 7/1998 |
| CN | 1256032 A | 6/2000 |
| CN | 1663149 | 8/2005 |
| CN | 1706117 A | 12/2005 |
| EP | 0523687 A2 | 1/1993 |
| EP | 0709973 A1 | 5/1996 |
| EP | 0847146 A2 | 6/1998 |
| EP | 0853393 A1 | 7/1998 |
| EP | 0860953 A1 | 8/1998 |
| EP | 1538762 A2 | 6/2005 |
| EP | 1548526 A2 | 6/2005 |
| EP | 1615354 A2 | 1/2006 |
| EP | 1641167 A2 | 3/2006 |
| GB | 2272599 A | 5/1994 |
| GB | 2351420 A | 12/2000 |
| JP | 62040895 | 2/1987 |
| JP | 63160442 | 7/1988 |
| JP | 64011428 | 1/1989 |
| JP | 02100358 | 4/1990 |
| JP | 03021884 | 1/1991 |
| JP | 05063623 | 3/1993 |
| JP | 05102907 | 4/1993 |
| JP | 06013947 | 1/1994 |
| JP | 06334577 | 12/1994 |
| JP | 07030473 | 1/1995 |
| JP | 7079187 A | 3/1995 |
| JP | 07079205 | 3/1995 |
| JP | 07131401 | 5/1995 |
| JP | 8097762 A | 4/1996 |
| JP | 8274683 A | 10/1996 |
| JP | 08274706 | 10/1996 |
| JP | 09018484 A | 1/1997 |
| JP | 09130322 | 5/1997 |
| JP | 09162801 | 6/1997 |
| JP | 9162903 A | 6/1997 |
| JP | 09182155 | 7/1997 |
| JP | 09214418 | 8/1997 |
| JP | 10032557 A | 2/1998 |
| JP | 10107727 | 4/1998 |
| JP | 10135892 | 5/1998 |
| JP | 10242932 A | 9/1998 |
| JP | H10304437 A | 11/1998 |
| JP | 11055713 | 2/1999 |
| JP | 11127104 | 5/1999 |
| JP | 11298421 | 10/1999 |
| JP | 2000013248 A | 1/2000 |
| JP | 2000031877 | 1/2000 |
| JP | 2000502218 T | 2/2000 |
| JP | 2000082983 A | 3/2000 |
| JP | 2000509536 A | 7/2000 |
| JP | 2000236290 | 8/2000 |
| JP | 2000269873 | 9/2000 |
| JP | 2001016152 | 1/2001 |
| JP | 2001111575 A | 4/2001 |
| JP | 2001136115 | 5/2001 |
| JP | 2001244864 A | 9/2001 |
| JP | 2001357480 A | 12/2001 |
| JP | 2002033691 | 1/2002 |
| JP | 2002111571 A | 4/2002 |
| JP | 2002223188 A | 8/2002 |
| JP | 2002271255 | 9/2002 |
| JP | 2002281042 A | 9/2002 |
| JP | 2003174394 | 6/2003 |
| JP | 2003198442 | 7/2003 |
| JP | 2003244050 | 8/2003 |
| JP | 2003250174 A | 9/2003 |
| JP | 2004056210 | 2/2004 |
| JP | 2004328666 | 11/2004 |
| JP | 2004538682 | 12/2004 |
| JP | 2005072646 | 3/2005 |
| JP | 2005110150 | 4/2005 |
| JP | 2005191691 A | 7/2005 |
| JP | 2005236626 | 9/2005 |
| JP | 2005252692 A | 9/2005 |
| JP | 2005295499 A | 10/2005 |
| JP | 2005531202 | 10/2005 |
| JP | 2005531265 | 10/2005 |
| JP | 2006503481 | 1/2006 |
| JP | 2006505146 | 2/2006 |
| JP | 2006197488 A | 7/2006 |
| JP | 2007528147 A | 10/2007 |
| KR | 19980063664 | 10/1998 |
| KR | 2004000426 A | 1/2004 |
| KR | 100610929 | 8/2006 |
| RU | 2120702 C1 | 10/1998 |
| RU | 2233045 C2 | 7/2004 |
| RU | 2242086 C2 | 12/2004 |
| RU | 2249916 C2 | 4/2005 |
| RU | 2264036 | 11/2005 |
| WO | WO9214339 | 8/1992 |
| WO | WO-9222145 A1 | 12/1992 |
| WO | 9505037 A1 | 2/1995 |
| WO | WO9622636 A1 | 7/1996 |
| WO | WO9715991 | 5/1997 |
| WO | WO9734434 | 9/1997 |
| WO | WO98052365 | 11/1998 |
| WO | WO9858461 A1 | 12/1998 |
| WO | WO99023844 | 5/1999 |
| WO | WO9959264 A2 | 11/1999 |
| WO | WO0050971 A2 | 8/2000 |
| WO | WO0152447 | 7/2001 |
| WO | WO0176098 A2 | 10/2001 |
| WO | WO0182512 A1 | 11/2001 |
| WO | WO0199308 | 12/2001 |
| WO | WO0208857 A2 | 1/2002 |
| WO | WO0217572 A2 | 2/2002 |
| WO | WO03012005 A2 | 2/2003 |
| WO | WO04001892 | 12/2003 |
| WO | WO04001986 A2 | 12/2003 |
| WO | WO04002014 | 12/2003 |
| WO | WO2004002014 A1 | 12/2003 |
| WO | WO2004004365 | 1/2004 |
| WO | WO2004032362 | 4/2004 |
| WO | WO2004036789 | 4/2004 |
| WO | WO2004038958 | 5/2004 |
| WO | WO2004047308 | 6/2004 |
| WO | WO2004062305 A1 | 7/2004 |
| WO | WO2004107693 A1 | 12/2004 |
| WO | WO2005050918 A2 | 6/2005 |
| WO | WO2005069249 A1 | 7/2005 |
| WO | WO2005069656 A1 | 7/2005 |
| WO | WO2005115022 | 12/2005 |
| WO | WO-2006081405 A2 | 8/2006 |

OTHER PUBLICATIONS

International Search Report and Written Opinion of the International Searching Authority dated Oct. 24, 2007 in corresponding patent application No. PCT/US06/22075.

Andrisano, et al., On the Spectral Efficiency of CPM Systems over Real Channel in the Presence of Adjacent Channel and CoChannel Interference: A Comparison between Partial and Full Response Systems, IEEE Transactions on Vehicular Technology, vol. 39, No. 2, May 1990.

Code of Federal Regulations. Title 47 Telecommunication; "Federal Communications Commission code part 15.407," Federal Communications Commission vol. 1, chapter I, part 15.407.

First Office Action issued from the Chinese Patent Office in connection with corresponding Chinese application No. 200380101286.2.

Draft Corrigendum to IEEE Standard for Local and Metropolitan Area Networks—Part 16: Air Interface for Fixed Broadband Wireless Access Systems, IEEE P802.16—2004/Cor1/D5.

Draft IEEE Standard for Local and Metropolitan Area Networks—Part 16. Air Interface for Fixed and Mobile Broadband Wireless Access Systems; Amendment for Physical and Medium Access Control Layers for Combined Fixed and Mobile Operation in Licensed Bands.

(56) References Cited

OTHER PUBLICATIONS

First Report issued by IP Australia on Jul. 31, 2007 in connection with the corresponding Australian application No. 2003239577.
IEEE 802.16(e), Part 16: Air interface for Fixed Broadband Wireless Access Systems, 2005, Sections 8.4.10.2.1; 8.4.10.3.2.
IEEE Std 802.11-1999 (Reaff 2003), "Part 11: Wireless LAN Medium Access Control (MAC) and Physical Layer (PHY) Specifications," LAN MAN Standards Committee of the IEEE Computer Society; Paragraphs 7.2.3.1 and 7.2.3.9; Paragraph 7.3.2.4; Paragraphs 15.4.6.2 and 18.4.6.2.
IEEE Std 802.11b-1999, "Part 11: Wireless LAN Medium Access Control (MAC) and Physical Layer (PHY) specifications: Higher-Speed Physical Layer Extension in the 2.4 GHz Band," IEEE-SA Standards Board, Supplement to ANSI/IEEE Std. 802.11, 1999 Edition, Approved Sep. 16, 1999.
IEEE Std 802.11g-2003. "Part 11: Wireless LAN Medium Access Control (MAC) and Physical Layer (PHY) specifications: Amendment 4. Further Higher Data Rate Extension in the 2.4 GHz Band," IEEE Computer Society, Published by The Institute of Electrical and Electronics Engineers, Inc., Jun. 27, 2003.
IEEE Std 802.16-2001; "Part 16. Air Interface for Fixed Broadband Wireless Access Systems," IEEE Computer Society and the IEEE Microwave Theory and Techniques Society. Published by The Institute of Electrical and Electronics Engineers, Inc., Apr. 8, 2002.
Kannangara, et at., "Analysis of an Adaptive Wideband Duplexer with Double-Loop Cancellation," IEEE Transactions on Vehicular Technology, vol. 56, No. 4. Jul. 2007, pp. 1971-1982.
Kutlu, et al., "Performance Analysis of MAC Protocols for Wireless Control Area Network," 1996 IEEE, pp. 494-499.
Mexican Office communication dated Jul. 2, 2007 issued from Mexican Patent Office for application PA/a/2004/011588 with partial translation thereof.
Notification of the First Office Action from Chinese Patent Office dates Sep. 8, 2006 for the corresponding Chinese patent application No. 200380105267.7.
Office Action issued from the Mexican Patent Office dated Feb. 22, 2008 in connection with the corresponding Mexican Patent Application No. PA/a/2004/011588.
Office communication dated Jan. 12, 2007 issued from the European Patent Office for counterpart application No. 03734139.9-1246.
Office communication dated Oct. 19, 2006 issued from the Mexican Patent Office for counterpart application No. PA/a/2004/011588.
Official communication issued from the European Patent Office dated Aug. 7, 2007 for the corresponding European patent application No. 03759271.4-2412.
Official communication issued from the European Patent Office dated Dec. 19, 2006 for the corresponding European patent application No. 03759271.4-2412.
Second Office Action issued from the Chinese Patent Office on Jul. 20, 2007 in connection with corresponding Chinese application No. 200380101286.2.
Specifications for2.3 GHz Band Portable Internet Service—Physical & Medium Access Control Layer, TTAS.KO-06.0082/R1, Dec. 2005.
Third Office Action issued from the Patent Office of People's Republic of China dated Jan. 4, 2008 in corresponding Chinese Patent Application No. 200380101286.2.
Translation of Office Action issued by Chinese Patent Office on Oct. 19, 2007 in connection with the corresponding Chinese application No. 03814391.7.
U.S. PTO Office Action mailed on Apr. 17, 2007 for the corresponding parent U.S. Appl. No. 11/339,838, now U.S. Patent No. 7,230,935.
U.S. PTO Office Action mailed on Jan. 24. 2007 for the corresponding parent U.S. Appl. No. 11/339,838, now U.S. Patent No. 7,230,935.
U.S. PTO Office Action mailed on Nov. 21. 2006 for the corresponding parent U.S. Appl. No. 11/339,838, now U.S. Patent No. 7,230,935.
U.S. PTO Office Action mailed on Nov. 6, 2006 for the corresponding parent U.S. Appl. No. 11/339,838, now U.S. Patent No. 7,230,935.
Draft IEEE Standard for Local and Metropolitan Area Networks—Part 16: Air Interface for Fixed and Mobile Broadband Wireless Access Systems; Amendment for Physical and Medium Access Control Layers for Combined Fixed and Mobile Operation in Licensed Bands. IEEE P802.16E/D12, Oct. 2005.
Office Action English translation dated Jul. 4, 2008 issued from Chinese Patent Office for Application No. 03814391.7.
Office Action English translation dated Jun. 29, 2009 issued from Japanese Patent Office for Application No. 2004-541532.
Translation of Office Action in Japanese application 2004-515701, corresponding to U.S. Appl. No. 10/516,327, citing WO00050971, JP2000-031877, JP2002-033691, JP2002-111571 and JP11-127104, Dated May 25, 2010.
Translation of Office Action in Japanese application 2004-544751, corresponding to U.S. Appl. No 10/531,078, citing WO00050971, JP2002-111571, JP05-102907, JP63-160442, JP2000-502218, JP10-032557 and JP2000-082983, Dated Aug. 25, 2009.
Translation of Office Action in Japanese application 2004-553510, corresponding to U.S. Appl. No. 10/533,589, citing WO00050971, JP09-182155, JP64-011428 and JP62-040895. Dated Sep. 29, 2009.
Translation of Office Action in Japanese application 2004-565505, corresponding to U.S. Appl. No. 10/563,471, citing JP08-097762 and JP2001-111575, Dated Aug. 11, 2009.
Translation of Office Action in Japanese application 2004-565505, corresponding to U.S. Appl. No. 10/563,471, citing JP08-097762. JP2001-111575, JP09-018484 and JP11-055713. Dated Sep. 14, 2010.
Translation of Office Action in Japanese application 2004-565505, corresponding to U.S. Appl. No. 10/563,471, citing JP09-018484. Dated Feb. 23, 2010.
Translation of Office Action in Japanese application 2009-503041, corresponding to U.S. Appl. No. 11/730,361, citing W005115022, JP10-135892, JP2005-531265, 2006-503481, JP2005-531202 and JP2006-505146 . Dated Oct. 26, 2010.
Translation of Office Action in Korean application 2008-7026775, corresponding to U.S. Appl. No. 11/730,361, citing KR100610929 Dated Aug. 30, 2010.
Translation of Office Action in Korean application 2009-7010639, corresponding to U.S. Appl. No. 12/439,018, citing WO01052447 and US20040208258 Dated Nov. 15, 2010.
Dohler, Mischa, et al., Distributed PHY-layer mesh networks, 14th IEEE Proceedings on Personal, Indoor and Mobile Radio Communications, 2003., The United States of America, IEEE, Sep. 7, 2003, vol. 3, pp. 2543 to 2547.
Fujii, et al., Ad-hoc Cognitive Radio Cooperated with MAC Layer, Institute of Electronics, Information and Communication Engineers (IEICE) Technical Report, Japan, Institute of Electronics, Information and Communication Engineers (IEICE), May 4, 2005, vol. 105 (36), pp. 59 to 66.
Translation of Office Action in Japanese application 2007-513349 corresponding to U.S. Appl. No. 11/546,242, citing WO04032362, WO2004001986, JP09214418, JP07131401, JP2004056210, JP2000082983, JP09130322, JP2003244050, JP2003198442, US6377612, JP2006503481, JP2002111571, JP09162801, JP2005531202, WO2004001892 and JP10107727 dated Nov. 16, 2010.
Translation of Office Action in Japanese application 2009-526736 corresponding to U.S. Appl. No. 12/307,801 , citing US20040110469, US20060019603, JP2005072646, JP2001016152, JP11298421, JP2001136115, JP2005110150, JP2005236626, WO9715991 and WO0199308 dated Jan. 4, 2011.
Zimmermann, et al., "On the performance of cooperative diversity protocols in practical wireless systems," IEEE 58th Vehicular Technology Conference, 2003, The United States of America, IEEE, Oct. 6, 2003, vol. 4, pp. 2212 to 2216.
Supplementary European Search Report—EP06760719—Search Authority—Munich—May 22, 2012.

* cited by examiner

| NAME | DESCRIPTION | TYPICAL VALUE |
|---|---|---|
| $E_{WLAN-ONLY}$ | ENABLE WLAN-ONLY REPEATER OPERATION. POSSIBLE VALUES ARE: TRUE OR FALSE. | FALSE |
| $T_{SEARCH}$ | WLAN PREAMBLE SEARCH TIMEOUT. | 8 μs |
| $T_{HYST}$ | CLEAR-TO-TRANSMIT HYSTERESIS TIME. | 2 μs |
| $T_{CTX}$ | MINIMUM TIME DURING WHICH THE HYSTERESIS-FILTERED RSSI COMPARATOR SIGNAL MUST BE INACTIVE FOT $CTX_A$ OR $CTX_B$ TO BECOME ACTIVE. | 40 μs |
| $T_{PUNCTURE}$ | DURATION OF PUNCTURING INTERVAL IN PUNCTURED BEACON, PROBE-RESPONSE OR CORRECTED PROBE-RESPONSE ACK FRAMES. | 7 μs |
| $E_{BCNBLOCK}$ | ENABLE REPEATER BLOCKING OF BEACON FRAMES. POSSIBLE VALUES ARE: TRUE OR FALSE | TRUE |
| $E_{PRBLOCK}$ | ENABLE REPEATER BLOCKING OF PROBE-RESPONSE FRAMES. POSSIBLE VALUES ARE: TRUE OR FALSE | TRUE |
| $E_{ACKBLOCK}$ | ENABLE REPEATER BLOCKING OF CORRECTED PROBE-RESPONSE ACK FRAMES. POSSIBLE VALUES ARE: TRUE OR FALSE | TRUE |
| $M_{BLOCK}$ | METHOD FOR BLOCKING BEACON, PROBE-RESPONSE, AND CORRECTED PROBE-RESPONSE ACK FRAMES. POSSIBLE VALUES ARE: PUNCTURE, TRUNCATE OR TRUNCATE-PASSING/PUNCTURE-FAILING. THE TRUNCATE OR TRUNCATE-PASSING/PUNCTURE-FAILING OPTION CAUSES BEACON PROBE RESPONSE FRAMES THAT PASS ALL FILTERS TO BE TRUNCATED, WHILE FRAMES THAT FAIL SOME FILTER ARE PUNCTURED. THIS OPTION IS USED TO SUPPORT OVERLAPPING CTS-TO-SELF FRAMES. WHEN $M_{BLOCK}$ HAS THE VALUE TRUNCATE-PASSING/PUNCTURE-FAILING, CORRECTED PROBE-RESPONSE ACK FRAMES ARE ALWAYS PUNCTURED. | TRUNCATE-PASSING/ PUNCTURE-FAILING |
| $E_{PRACK}$ | ENABLE REPEATER TRANSMISSION OF ACKs FOR PROBE-RESPONSE FRAMES RECEIVED FROM THE AP. POSSIBLE VALUES: TRUE OR FALSE | TRUE |
| $T_{PRACK}$ | DELAY BETWEEN THE END OF THE PROBE-RESPONSE RECEIVED FROM THE AP AND THE START OF THE ACKNOWLEDGE FRAME TRANSMITTED BY THE REPEATER. | 8 μs |
| $TSTART_{CPRACK}$ | START TIME FOR THE CORRECTED PROBE-RESPONSE ACK REECEPTION WINDOW, MEASURED FROM THE END OF THE CORRECTED PROBE-RESPONSE FRAME TRANSMITTED BY THE REPEATER. | 5 μs |
| $TEND_{CPRACK}$ | END TIME FOR CORRECTED PROBE-RESPONSE ACK RECEPTION WINDOW, MEASURED FROM THE END OF THE CORRECTED PROBE-RESPONSE FRAME TRANSMITTED BY THE REPEATER. | 20 μs |
| $E_{SAFILTER}$ | ENABLE THE SOURCE MAC ADDRESS FILTER FOR BEACON AND PROBE-RESPONSE FRAMES. POSSIBLE VALUES ARE: TRUE OR FALSE. | TRUE |
| $E_{DAFILTER}$ | ENABLE THE DESTINATION MAC ADDRESS FILTER FOR PROBE-RESPONSE FRAMES. POSSIBLE VALUES ARE: TRUE OR FALSE. | TRUE |
| $E_{CCFILTER}$ | ENABLE THE CURRENT CHANNEL FILTER FOR BEACON AND PROBE-RESPONSE FRAMES. POSSIBLE VALUES ARE: TRUE OR FALSE. | FALSE |

*FIG. 9*

CONTROL MESSAGE MANAGEMENT IN PHYSICAL LAYER REPEATER

CROSS REFERENCE TO RELATED APPLICATIONS

This application is related to and claims priority from U.S. provisional application No. 60/687,890 filed Jun. 7, 2005, and is a continuation-in-part of the following applications: U.S. patent application Ser. No. 10/531,077 filed on Apr. 12, 2005 and entitled WIRELESS LOCAL AREA NETWORK REPEATER WITH IN-BAND CONTROL CHANNEL (claiming priority from PCT application no. PCT/US03/31515 filed on Oct. 24, 2003 and U.S. provisional application No. 60/420,449 filed on Oct. 24, 2002); U.S. patent application Ser. No. 10/536,471 filed on May 26, 2005 and entitled IMPROVED WIRELESS NETWORK REPEATER (claiming priority from PCT Application No. PCT/US03/039889 filed on Dec. 16, 2003 and U.S. provisional application No. 60/433,171 filed on Dec. 16, 2002); and U.S. patent application Ser. No. 10/529,037 filed on Mar. 24, 2005 and entitled WIRELESS LOCAL AREA NETWORK WITH REPEATER FOR ENHANCING NETWORK COVERAGE (claiming priority from PCT application no. PCT/US03/28558 filed on Oct. 1, 2003 and U.S. provisional application No. 60/414,888 filed on Oct. 1, 2002). The contents of all of the above identified applications are incorporated herein by reference.

FIELD OF THE INVENTION

The present invention relates generally to wireless communications and more specifically to a repeater configuration for enhancing the performance of wireless networks by managing control messages to manage signal traffic.

BACKGROUND OF THE INVENTION

Because of the increasing popularity of unrestrained access to broadband services by, for example, portable computing devices, there is an increasing need to extend the range of nodes such as access points associated with wireless networks, including but not limited to wireless local area networks (WLANs) and wireless metropolitan area networks (WMANs) described and specified in the 802.11, 802.16 and 802.20 standards. The effective proliferation of wireless networks depends heavily on sustaining and increasing performance levels as user demands increase.

Performance shortcomings between actual and specified performance levels can be caused by attenuation of the radiation paths of radio frequency (RF) signals, which are typically transmitted at frequencies of 2.4 GHz or 5.8 GHz in an operating environment such as an indoor environment. Base or AP to receiver or client ranges are generally less than the coverage range required in a typical home, and may be as little as 10 to 15 meters. Further, in structures having split floor plans, such as ranch style or two story homes, or those constructed of materials capable of attenuating RF signals, areas in which wireless coverage is needed may be physically separated by distances outside of the range of, for example, an 802.11 protocol based system.

Attenuation problems may be exacerbated in the presence of interference in the operating band, such as interference from other 2.4 GHz devices or wideband interference with in-band energy. Still further, data rates of devices operating using the above standard wireless protocols are dependent on signal strength. As distances in the area of coverage increase, wireless system performance typically decreases. Lastly, the structure of the protocols themselves may affect the operational range.

One common practice in the mobile wireless industry to increase the range of wireless systems is through the use of repeaters. For pure physical layer repeaters, problems and complications can arise in that the random packet nature of typical WLAN protocols provides no defined receive and transmit periods. Because packets from each wireless network node are spontaneously generated and transmitted and are not temporally predictable, undesirable consequences such as packet collisions may occur.

One system, described in U.S. application Ser. No. 10/516,327, which is a PCT national stage application based on international application no. PCT/US03/16208, resolves many localized transmission and reception problems by providing a repeater that isolates receive and transmit channels using a frequency detection and translation method. The WLAN repeater described therein allows two WLAN units to communicate by translating packets associated with one device at a first frequency channel to a second device using a second frequency channel. Since the repeater operates as a physical layer device, the media access control (MAC) address of the packets are not modified, as would be the case in a repeater configured as a layer 2 or higher device. The direction associated with the translation or conversion, such as from the first frequency channel associated with the first device to the second frequency channel associated with the second device, or from the second frequency channel to the first frequency channel, depends upon a real time configuration of the repeater and the WLAN environment.

For example, the WLAN repeater may be configured to monitor both frequency channels for transmissions and, when a transmission is detected, translate the signal received on the first frequency channel to the other frequency channel, where it is transmitted to the destination node. It is important to note that the frequency translating repeater described in the above application acts in near real time to receive, boost and retransmit packets.

While addressing many of the problems in the art, the frequency translating repeater described in U.S. application Ser. No. 10/516,327 lacks certain control message management capabilities such as the ability to modify control message signals to, for example, prevent other transmitters from transmitting additional signals to the repeater while the repeater transmits a modified signal to intended recipients. More specifically, the above repeater cannot prevent the other transmitters from responding to the modified signal during transmission of the modified signal.

SUMMARY OF THE INVENTION

Accordingly, one embodiment of the present invention provides a repeater for use in a wireless local area network. The repeater includes a transceiver for receiving a signal on a first frequency channel and for transmitting the signal on a second frequency channel different from the first frequency channel, and a control message modulator/demodulator (MODEM) coupled to the transceiver for demodulating a receive control message on the first frequency channel and for modulating one or more transmit control messages that are transmitted by the transceiver on at least one of the first frequency channel and the second frequency channel in response to the received control message. The transmit control message transmitted on the first frequency channel may be punctured so as to reserve a medium associated with the first frequency channel. The transceiver may include an amplifier for amplifying the control message, the amplifier having an associated gain that is adjustable to enable the control message to be punctured. In addition or alternatively, an automatic gain control apparatus may be provided to enable the transmit control message transmitted on the first frequency channel to be punctured. The repeater may comprise a regenerative frequency translating physical layer repeater wherein the transmit control message transmitted on the first frequency channel is punctured in the digital domain so as to reserve a medium associated with the first frequency channel.

Another embodiment provides a method for selectively modifying messages in a frequency translating repeater based on a parameter of the messages. The method includes: searching for a preamble associated with a message received on a receive frequency channel; decoding the received message if the preamble is detected; generating a modified internal message; and transmitting the modified internal message on both the receive frequency channel and a transmit frequency channel to prevent further activity on the receive frequency channel. The method may also include puncturing a packet associated with the modified internal message transmitted on the receive frequency channel to reserve a medium associated with the receive frequency channel and to prevent further activity thereon.

Another embodiment includes a physical layer repeater having a transceiver for receiving a control message on a first frequency channel and a transmitter for transmitting the control message on a second frequency channel different from the first frequency channel, and a modulator/demodulator (MODEM) coupled to the transceiver for demodulating the received control message on the first frequency channel and for modulating a modified version of the control message with an unmodified media access control (MAC) layer transmitted on the second frequency channel to achieve a network objective. The repeater, which may be either a regenerative or a non-regenerative repeater, achieves a network objective that may include one of frequency translation of the modified control message signal from the first frequency channel to the second frequency channel, limited access point (AP) connectivity and a predefined client priority.

Yet another embodiment includes a physical layer repeater configured to selectively generate and transmit control message packets between wireless stations on both a transmit side and a receive side and to manipulate an end to end protocol of the control message packets in a manner that does not change media access control (MAC) addresses of the end to end protocol so as to achieve a network objective.

Another embodiment includes a wireless repeater configured to selectively generate and transmit control message packets between wireless stations on both a first segment and a second segment to ensure that a media access control (MAC) level protocol between the first and second segments functions properly.

Finally, it should be noted that the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention

FIG. 9 is a table of configuration parameters for firmware programmed into and run by the processor shown in FIG. 1.

DETAILED DESCRIPTION OF THE INVENTION

Referring now to the drawings in which like numerals reference like parts, several exemplary embodiments in accordance with the present invention will now be described. The instant disclosure is provided to further explain in an enabling fashion the best modes of performing the exemplary embodiments of the present invention, and is further offered to enhance an understanding and appreciation for the inventive principles and advantages thereof, rather than to limit the invention in any manner.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefor, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

Figure 1:
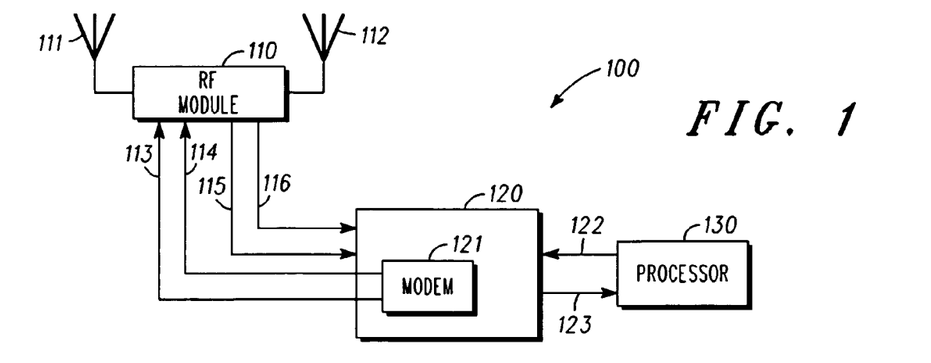
FIG. 1 is a block diagram illustrating the components of a repeater in accordance with various exemplary embodiments of the present invention.

FIG. 1 shows a block diagram of an exemplary repeater 100. The repeater 100, which may be either a regenerative or a non-regenerative repeater, includes three basic components: a front-end RF module, or transceiver, 110; a repeater module 120; and a processor 130. The front-end RF module 110, repeater module 120 and processor 130 are preferably implemented as separate chips, such as ASICs, and packaged together as a single chip set. Although the repeater 100 will be described in terms of an RF signal to signal repeater, one skilled in the art will appreciate that the control message management described below is also applicable to digital repeaters such as symbol to symbol or packet to packet repeaters in which physical layer control message management is performed.

The RF module 110 includes a first antenna 111 and a second antenna 112, each of which in a more general sense may be considered any type of electromagnetic transducer capable of receiving or transmitting energy from/of a propagating signal. The RF module 110 is configured to transmit and receive signals over, for example, a first frequency channel A on the first antenna 111, and to transmit and receive signals over, for example, a second frequency channel B on the second antenna 112. It should be noted that throughout the present description the term "frequency channel" will be used interchangeably with more abbreviated terminology such as "channel" or "frequency." It should also be appreciated that, in a broader sense, the repeater may be configured to transmit and receive signals or messages over first and second discrete communication segments.

The repeater module 120 includes a modulator/demodulator (MODEM) 121, such as an 802.11 MODEM, that is bi-directionally coupled to the RF module 110 by lines 113, 114, 115 and 116. The repeater module 120 is also coupled to a processor 130 through a data link such as a data bus 123 and may also have an analog control connection 122, which can be a series of analog connections.

Figure 2:
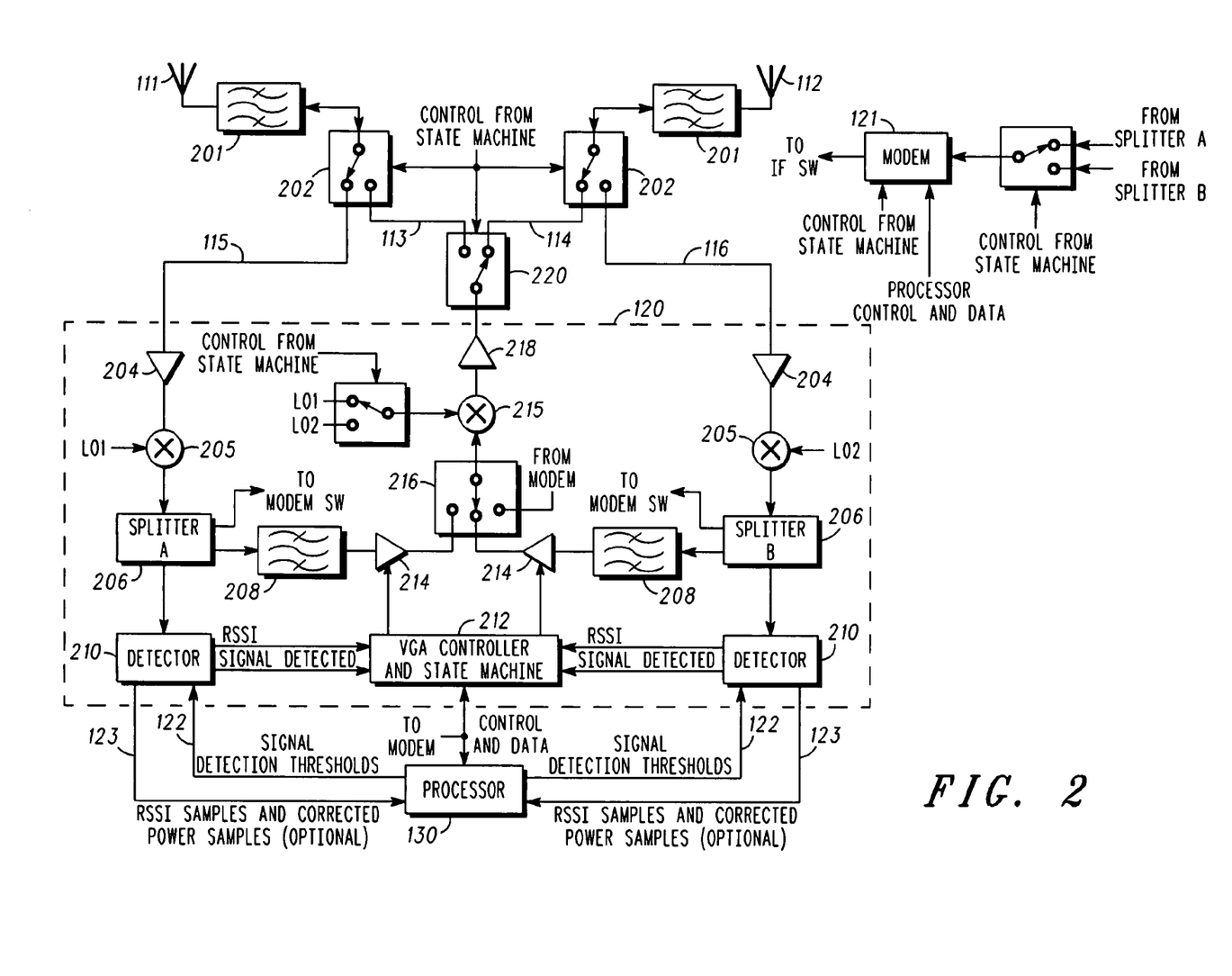
FIG. 2 is a detailed schematic diagram illustrating the components of the repeater module shown in FIG. 1.

FIG. 2 is a more detailed schematic diagram 200 of the repeater 100 of FIG. 1, and in particular of the components included in the repeater module 120 in addition to the MODEM 121. RF signals received by antennas 111, 112, are respectively filtered by band pass filters 201 and input through switches 202 into low noise amplifiers (LNAs) 204. The signals are then mixed with signals from local oscillators LO1, LO2 at mixers 205 to produce intermediate frequency (IF) signals that are typically lower in frequency than the RF signals. The IF signals are then input respectively into splitters 206, which each operate to separate the IF signals into two separate paths. One of the paths from each of the splitters 206 couples the split signal to a delay line (shown here as band pass filter 208) while the other path couples the split signal to a power detector 210.

Each of the power detectors 210 is coupled to both the processor 130 and to a Variable Gain Amplifier (VGA) controller and state machine 212. The processor 130 and the VGA controller and state machine 212 in turn are coupled to the MODEM 121 as are the splitters 206. In addition, the VGA controller and state machine 212 is coupled to VGAs 214 to control the gain thereof. Outputs from the VGAs 214 and from the MODEM 121 are input into a mixer 215 through an IF switch 216 and are mixed with signals from the local oscillators LO1, LO2. The resulting signal is then amplified by power amplifier 218 before being output through switch 220 and one of the switches 202 to one of the antennas 111, 112.

Additional details regarding the above exemplary repeater may be found in, for example, U.S. patent application Ser. No. 10/531,077 filed on Apr. 12, 2005, the contents of which have been incorporated by reference.

Although the repeater 100 repeats most 802.11 WLAN traffic in a transparent manner, the repeater 100 actively intervenes in certain 802.11 media access control (MAC) procedures to facilitate association between network nodes such as Access Points (APs) and other devices (referred to as Stations or STAs) operating on different frequencies and linked by the repeating function of the repeater 100.

In the repeater 100, during an initialization sequence such as a one button push initialization procedure occurring during a several second button activation interval, the repeater 100 scans available frequency channels and available APs and chooses the best of each based primarily on channel signal quality and strength. The MODEM 121 receives and generates network management messages from the AP and from one or more Stations, and the repeater 100 can generate modified control message signals as described in greater detail herein.

To enable "plug and play" usage of the repeater 100 in a network, the repeater 100 can generate and insert modified control messages into the network or can simultaneously transmit the modified control messages on both channels being used by the repeater 100. Both methods have advantages and disadvantages. Simultaneous transmission of control messages is more hardware intensive but requires fewer messages to be sent out and thus is more efficient from a network standpoint. The generation of additional control messages can be implemented using, for example, the existing hardware of a repeater such as the Xtender™ brand repeater, which is commercially available from WIDEFI Corporation, assignee of the present application.

However, as additional network traffic is generated, overall network efficiency is reduced. One of ordinary skill in the art will appreciate that simultaneous transmission of control messages on all repeater channels to reserve the media can be accomplished in a variety of ways with slight hardware modifications, such as by including splitters in the up conversion side of the repeater 100 or by having separate transmit amplifiers for each outbound control message channel. Simultaneous transmission therefore does not require as in-depth of a treatment as does the generation of additional control messages, which will now be discussed in greater detail.

As previously discussed, one way to insert control messages that will effectively merge the collision domains of the two channels selected by the repeater 100 during setup is to simultaneously transmit the necessary control messages on both frequency channels. In other words, the repeater 100 will simultaneously transmit control messages on the frequency on which the repeated message will be transmitted as well as the frequency on which the message was received as soon as the repeater 100 detects the message. When the repeater 100 transmits the message on the receive frequency, the energy on the receive frequency will prevent other transmitters from attempting to transmit on the channel in accordance with, for example, carrier sense multiple access with collision avoidance (CSMA-CA) protocol procedures and will act as a hold off procedure.

Further, the repeater 100 also "punctures" the message transmitted on the receive frequency. That is, the repeater 100 drops enough symbols from the packet such that the AP or Station receiving the packet deems the packet as being unusable. This "puncturing" of the message can be performed in one of numerous ways, including turning down the gain on amplifiers in the repeater or the automatic gain control in the repeater. Therefore, the message will be processed but discarded by the receiving AP or Station, thus occupying potential users of the receive frequency for the duration of the transmission of the modified message toward the intended recipients on the transmit channel. The packet sent on the transmit channel is not punctured.

One of ordinary skill in the art will recognize the advantages gained from the above concepts and the concepts further described herein below and will recognize that several approaches can be used in the actual hardware to carry out control message modification, hold-off and/or medium reservation techniques.

The following describes exemplary MAC layer management features of the repeater 100 and the insertion of particular control messages to facilitate "plug and play" repeater functionality. The MAC layer management features that are discussed include basic protocols, packet filtering and medium reservation. Each of these features may be individually enabled and disabled, but, in practice, all are used.

Repeater Operation

Referring now to FIG. 1 and the table of repeater parameters listed in FIG. 9, during its initial configuration process, the repeater 100 selects two channel frequencies, such as 802.11g channel frequencies, which will be referred to as channels A and B. The repeater 100 simultaneously monitors both frequencies and generates internal received signal strength indicator (RSSI) voltages ($RSSI_A$ and $RSSI_B$). These RSSI voltages are compared to RSSI threshold voltages $RSTH_A$ and $RSTH_B$, respectively, which are dynamically adjusted by firmware running in the processor 130 to compensate for changing environmental conditions.

Whenever $RSSI_A > RSTH_A$, the repeater 100 quickly configures itself into an RF repeater that translates the received signal on channel A into a slightly-delayed, frequency-shifted copy on channel B. Similarly, when $RSSI_B > RSTH_B$, signals received on channel B are repeated on channel A. This repeat signal path is linear, and is implemented entirely with analog circuitry such as the exemplary circuitry in FIG. 2.

At the same time it starts repeating a new signal, the repeater 100 begins searching for an 802.11 preamble (either direct sequence or OFDM) within the incoming signal. If the repeater is configured for "repeat WLAN only" mode (see parameter $E_{WLAN-ONLY}$), and a valid preamble is not detected within the timeout delay $T_{SEARCH}$, the repeater 100 turns off its power amplifier, such as the power amplifier 218 in FIG. 2, until the RSSI on the input channel falls below the corresponding threshold.

As in the case of a single-frequency WLAN, a collision may occur if an 802.11 node begins transmitting while the repeater 100 is also repeating a signal on the same frequency. In effect, the repeater 100 joins the collision domains for both channels. Collision avoidance and recovery is managed by the standard 802.11 MAC protocol.

According to one embodiment, the repeater 100 receives and decodes 802.11b/g frames encoded with 1 or 2 Mbps Barker code direct sequence spread spectrum (DSSS) modulation. Such frames are simultaneously repeated and decoded.

In addition to repeating received packets, the repeater 100 may transmit internally generated frames, including modified versions of previously received beacon and probe-response frames, Acknowledge (Ack) frames, or proprietary frames such as XOS frames generated by the aforementioned Xtender™ repeater. While it is transmitting an internally generated frame on one channel, the repeater 100 does not repeat signals arriving on the opposite channel.

The repeater 100 generates an RSSI comparator digital signal for each frequency ($CMPOUT_A$ and $CMPOUT_B$). $CMPOUT_A$ is asserted whenever $RSSI_A > RSTH_A$. A related signal $CMP_A$ is asserted (a) whenever $CMPOUT_A$ is active, or (b) whenever the repeater 100 is transmitting on channel A, whether the transmitted signal is a signal repeated from channel B or an internally generated signal. Otherwise, $CMP_A$ is inactive. The same situation applies for $CMPOUT_B$ and $CMP_B$.

From $CMP_A$ and $CMP_B$, the repeater 100 derives two hysteresis-filtered channel busy indicators $SIG_A$ and $SIG_B$, based on hysteresis time $T_{HYST}$. The hysteresis time is the minimum time period during which $CMP_X$ must remain in the same logical state before $SIG_X$ switches to that state (where X is either A or B).

A Sequencer, which can be implemented by the VGA controller and state machine 212 shown in FIG. 2, also computes two clear-to-transmit (CTS) indicators $CTX_A$ and $CTX_B$, which go active when $SIG_A$ and $SIG_B$, respectively, have remained low for at least $T_{CTX}$.

It is noted that the 802.11 MAC layer uses a much more complex clear channel computation that relies both on RSSI and on the network allocation vector (NAV) channel reservation method. Because the CTS logic of the repeater 100 does not include the 802.11 MAC's NAV mechanism, there is a small probability that another station may transmit at the same time the repeater 100 is sending the modified packet. The repeater 100 will not detect the collision, and it will not attempt retransmission of the collided packet.

After the repeater 100 finishes transmitting an internally generated frame on one channel, it waits until the opposite channel's RSSI comparator becomes inactive, before repeating any signals. This "frame tail repeat suppression" feature prevents repeating the tail end of a frame that begins during the internally generated frame's transmission.

For example, suppose that the repeater 100 transmits internally generated frame X on channel A. While frame X is being transmitted, an 802.11 node begins transmitting a frame Y on channel B. Note that this 802.11 node cannot "hear" the transmission from the repeater 100. If frame Y continues beyond the end of frame X, frame tail repeat suppression prevents the repeater 100 from repeating the tail end of Y on channel B once the transmission of frame X is complete.

Beacon, Probe-Response, and ACK Handling

Both beacon and probe-response packets carry a Current Channel field, which indicates the 802.11b/g channel on which an AP is operating. For ease of discussion, it will be assumed that the AP is tuned to channel A of the repeater 100 so that the AP's beacon and probe-response packets are being repeated on channel B.

In the repeated packet, the Current Channel field points to channel A rather than channel B. Stations on channel B hearing the repeated beacon packet ignore it because it indicates an incorrect channel. In order to provide valid beacon packets to stations on channel B, the repeater 100 transmits a corrected copy of each beacon and probe response packet on channel B. Since the corrected copy is transmitted after the original beacon or probe response frame has ended, the Timestamp field must be modified to account for this extra delay.

Beacon and probe response packet correction consists of two changes to the MAC payload. First, the Current Channel field in the "DS Parameter Set" is changed to point to the output channel number of the repeater. Second, the Timestamp field is changed to reflect the actual transmission time of the modified packet. A new CRC-32 (FCS) value is inserted into the corrected frame. The corrected Timestamp is generated by adding to the Timestamp value in the received packet a time increment equal to the delay between beacon reception and corrected beacon transmission.

The Sequence Number, Source Address (SA), and Destination Address (DA) fields in the MAC header are left unchanged. Thus, the corrected beacon and probe response frames appear to originate at the AP. The power management fields (e.g., the TIM field) are also left unchanged, under the assumption that the time delay between the original and corrected frames will be small enough to maintain the validity of the TIM field contents.

The repeater 100 contains only one reception buffer for 802.11 beacon and probe-response frames. The repeater 100 normally does not decode any new 802.11b frames arriving while it is waiting to transmit a corrected beacon or probe-response frame associated with an earlier reception. The repeater 100 also contains multiple transmit buffers that can be used to generate ACK and CTS frames at any time. Thus, it is possible for the repeater 100 to transmit a CTS packet on one channel while receiving a beacon or probe-response frame on the other channel.

Interoperability tests have shown that some WLAN drivers may react adversely to the presence of the above described repeated packets that do not normally appear in a single-frequency WLAN. Such "illegal" packets may include repeated copies of uncorrected beacon and probe-response packets, as seen by the Stations on the channel opposite to that used by the AP, and ACK packets sent by Stations receiving a corrected probe-response packet, as seen by the AP on the channel opposite to the transmitting Station's channel. The effect of such "illegal" packet traffic varies greatly from manufacturer to manufacturer, and even from one version to the next in the same manufacturer's driver series.

In order to mitigate the effect of "illegal packets," the repeater 100 is normally configured to block certain frames from being repeated from one channel to the other. Frame blocking is performed by one of two methods: (1) truncation; and (2) puncturing. Regarding truncation, a repeater power amplifier, such as the power amplifier 218 in FIG. 2, is turned off in the middle of the packet for the remainder of the frame. Regarding puncturing, the power amplifier is turned off for a short period of duration $T_{PUNCTURE}$ in the middle of the MPDU, after which the rest of the frame is repeated normally. Since turning off the power amplifier effectively stops the transmission, blocked frames are received with CRC-32 errors by all listening nodes. It is unlikely, but possible that reception may succeed for a node that is located very close to the repeater 100.

Under the IEEE 802.11 standard, APs in a BSS ("infrastructure") network and all Stations in an IBSS ("ad-hoc") network periodically transmit beacon packets spaced at a uniform time interval. As is known, BSS network beacon protocol consists of a single frame transmission where beacon packets are broadcast packets.

Figure 3:
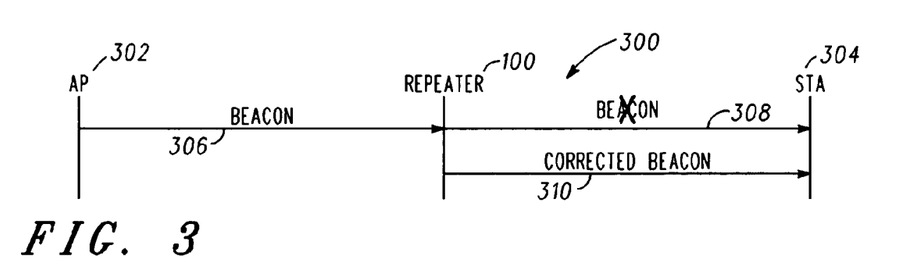
FIG. 3 is a packet sequence diagram illustrating the control message management features of the repeater of FIG. 1 operating in an 802.11 WLAN network relating to beacon protocol.

FIG. 3 shows a BSS network 300 and a corresponding packet sequence diagram in which the repeater 100 mediates between an AP 302 and a station 304 by handling beacon packets as shown, provided the beacon frame meets all filter criteria as discussed below. Packet sequence diagrams, such as that in FIG. 3, are used to illustrate the protocols of the repeater 100. Frames listed on the left of the center line are transmitted on one channel (the AP channel), while those listed on the right are transmitted on the opposite channel (the Station channel). The protocol packet sequence proceeds from top to bottom. Repeated packets are shown connected tail-to-head with the received packet. This convention should not be interpreted to mean that the repeated packet begins after the end of the received packet. On the contrary, repeated transmission occurs simultaneously with reception, with only a small sub-microsecond delay between the two frames. Otherwise, except for such repeated packets, the vertical dimension represents time advancing from top to bottom, though not to scale.

As shown in FIG. 2, the original beacon at 306 is blocked as indicated at 308, and a corrected beacon frame is internally generated and transmitted by the repeater 100 at 310 as soon as the CTS condition is true on the channel of the Station 304. In this and later figures, the large X at 306 indicates blocking of a repeated frame, either by puncturing or truncation.

In standard 802.11 probe-response frame protocol for BSS networks, when both the AP and the Station are operating on the same frequency, the AP may begin transmitting the probe-response soon after it receives the probe-request, or it may delay the start of the probe-response frame if it has other higher priority traffic or if the channel is busy. The probe-response is a unicast data frame. If the Station successfully receives the probe-response frame, it immediately sends back an ACK frame. If the Station fails to acknowledge the probe-response frame, the AP retries the frame until it gets a return ACK or it reaches the maximum number of retries (typically 4 to 7 times).

Figure 4:
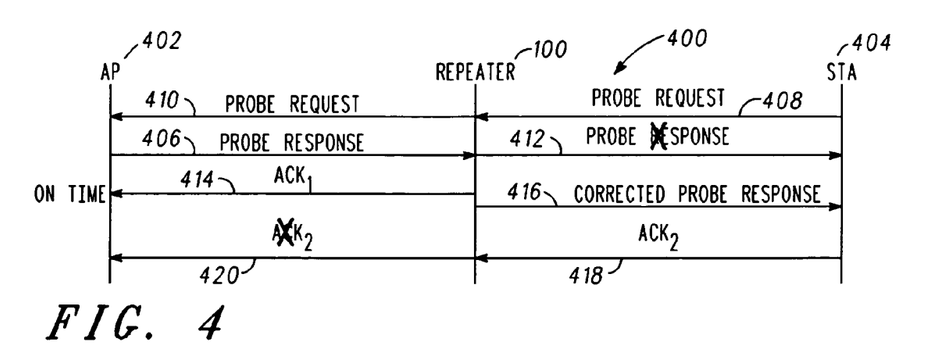
FIG. 4 is a packet sequence diagram illustrating the control message management features of the repeater of FIG. 1 operating in an 802.11 WLAN network relating to probe response protocol.

FIG. 4 shows a BSS network 400 and a corresponding packet sequence diagram in which the repeater 100 mediates between an AP 402 and the Station 404. The repeater 100 implements the following probe-response protocol to handle the probe-response packet generated at 406, provided the probe-response frame meets its filter criteria as discussed below. The repeater 100 forwards the probe request generated at 408 by the Station unchanged to the AP 404 at 410. The AP 402 responds with the probe-response frame at 406. As shown at 412, the repeater 100 prevents this probe-response from reaching the Station 404 by puncturing or truncating it. If the repeater 100 correctly receives the probe-response frame, at 414 it transmits an ACK frame ($ACK_1$) back to the AP 402. The delay between the end of the probe-response frame and the start of the ACK frame is specified by firmware parameter $T_{PRACK}$ as set forth in the table in FIG. 9. When the clear-to-transmit condition is true on the Station's 404 channel, the repeater 100 transmits a corrected probe-response frame at 416. If the Station 404 correctly receives the corrected probe-response frame, at 418 it transmits an ACK frame ($ACK_2$) back to the repeater 100. As shown at 420, the repeater 100 prevents this $ACK_2$ frame from reaching the AP 402 by puncturing or truncating it. In this context, the repeater 100 blocks any ACK packet for which reception starts between $TSTART_{CPRACK}$ and $TEND_{CPRACK}$, relative to the end of the corrected probe-response transmission. The repeater's decision to block does not take into account the MAC address inside the ACK frame. If the repeater 100 does not correctly receive the $ACK_2$ frame, it does not retry the corrected probe-response frame. Instead, the Station 404 generally sends another probe-request frame if it does not correctly receive the corrected probe-response frame.

Packet Filtering

The repeater 100 applies three separate tests (source address, destination address, and current channel) to each received probe-response packet. Two of these tests (source address filter and current channel filter) are also applied to each received beacon frame. Each of these tests corresponds to a "frame filter," which may be individually enabled or disabled (see parameters $E_{SAFILTER}$, $E_{DAFILTER}$, and $E_{CCFILTER}$ in the table in FIG. 9). If a filter is enabled, the associated test determines whether the filter results in a pass or fail status. If a filter is disabled, its status is always pass. As will be appreciated by one skilled in the art, a repeater state machine, such as the VGA controller and state machine 212 in exemplary FIG. 2, may be configured by a processor such as the processor 130 to perform the above filtering and decision-making functions.

When the repeater 100 receives a beacon frame B, a corrected beacon frame is transmitted, if and only if the source address and current channel filter statuses are both pass for the received frame B. When the repeater 100 receives a probe-response frame P, a probe-response ACK (i.e., $ACK_1$) and a corrected probe-response frame are transmitted, if and only if the source address, destination address, and current channel filter statuses are all pass for the received frame P.

Test Definitions

The repeater 100 includes an internal 6 byte MAC address register RXSRCMAC which, in the exemplary embodiment shown in FIG. 2, is included in the VGA controller and state machine 212, and which is normally loaded with the address of an AP selected by the firmware during repeater configuration. A beacon or probe-response frame passes the source address test if and only if its IEEE MAC source address is equal to the contents of RXSRCMAC. The repeater 100 remembers, in the 6-byte internal register LPRQSRCMAC, the IEEE MAC source address of the last probe-request packet that was received on the channel opposite that used by the AP. The AP channel is defined by register settings loaded via the firmware. A probe-response frame passes the destination address test if and only if its IEEE MAC destination address is equal to the contents of LPRQSRCMAC.

The repeater 100 contains two current channel registers which, in the exemplary embodiment shown in FIG. 2, are included in the VGA controller and state machine 212, and which specify the 802.11g channel numbers corresponding to repeater channels A and B. These registers are loaded by processor firmware. A beacon or probe-response frame passes the current channel test if and only if its Current Channel value is equal to the current channel register value corresponding to the channel (A or B) on which the frame is being received.

The above discussion focuses on the interactions between a single exemplary AP and a single exemplary Station. In a more general situation in which two or more APs respond to the same probe-request packet from the Station, if source address filtering is disabled, the repeater follows the corrected probe-response protocol for each AP's probe-response packet. The Station then has full choice of the AP with which it associates. When source address filtering is enabled, the repeater 100 generates a corrected probe-response only for probe-responses carrying the designated source MAC address, as specified by register RXSRCMAC as described above. The designated source MAC address identifies the AP "affiliated" with the repeater 100. Thus, the Station sees at most only one AP's probe-response and does not associate with other APs that also responded to its probe-request.

Figure 5:
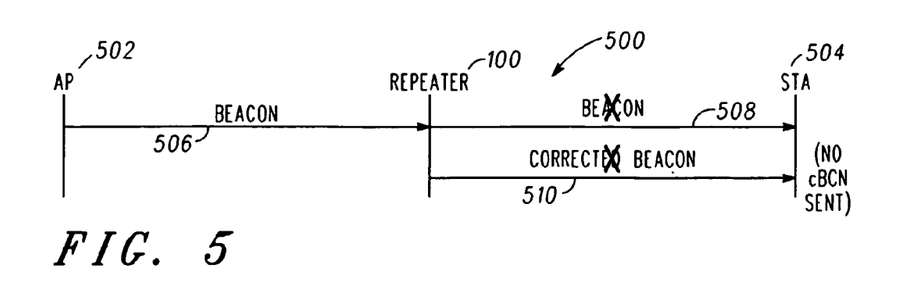
FIG. 5 is a packet sequence diagram illustrating the control message management features of the repeater of FIG. 1 operating in an 802.11 WLAN network relating to beacon protocol with a failing filter.
Figure 6:
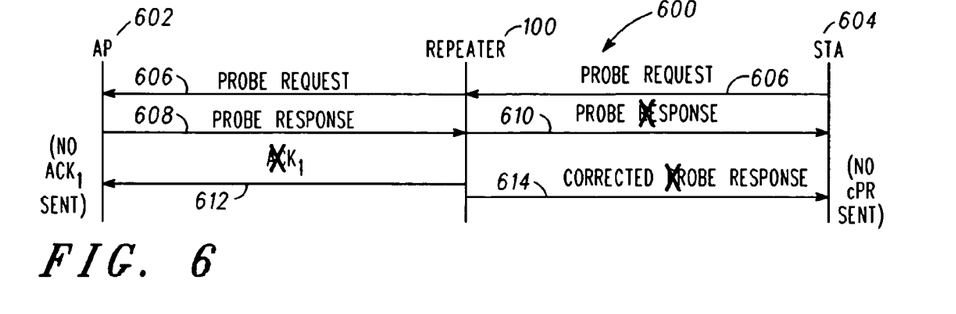
FIG. 6 is a packet sequence diagram illustrating the control message management features of the repeater of FIG. 1 operating in an 802.11 WLAN network relating to probe response protocol with a failing filter.

Unaffiliated APs are handled as shown in the BSS networks 500, 600 in FIG. 5 and FIG. 6, respectively. As shown at 500 in FIG. 5, when a beacon frame is transmitted from the AP 502 toward the Station 504 at 506, the repeater 100 generates neither a beacon frame as shown at 508 nor a corrected beacon frame as shown at 510. In FIG. 6, when the Station 604 generates and transmits a probe request to the AP 602 at 606, and the AP 602 generates a probe response at 608, the repeater 100 does not repeat the probe response as shown at 610, and does not generate an $ACK_1$ as shown at 612, or a corrected probe-response frame as shown at 614. Thus, the Station 604 is unaware of the AP's 602 presence.

In order to completely mask non-designated APs, the repeater 100 also blocks any beacon frames received from such APs. The protocol of FIGS. 5 and 6 also applies to any beacon or probe-response packet, respectively, failing the applicable filters. It should be noted that, in FIGS. 5 and 6, the large X is used to indicate both puncturing/truncation of repeated frames and frames that are never transmitted, as noted by the parenthesized comments.

The destination address filter prevents the repeater 100 from sending a corrected probe-response in the situation where the probe-request was sent by a node already operating on the AP's channel. When the probe-request is sent on the AP's channel, the requesting node can hear the AP's probe-response directly, so that no corrected probe-response is needed. The current channel filter prevents the repeater 100 from generating corrected beacon and probe-response frames for packets generated by a nearby node operating on an adjacent channel. The direct sequence modulation used at 1 or 2 Mbps often permits adjacent channel reception.

Ad-Hoc Networks

Based on above discussion of the repeater probe response protocol for BSS networks, a similar mechanism is also applicable to ad hoc networks. Specifically, in an IBSS "ad-hoc" network, beacon and probe-response frames may be sent by any Station in a network. Frame filtering by the source MAC address test is incompatible with such networks, because the repeater 100 must be ready to generate corrected beacon and probe-response frames for more than one source MAC address.

For IBSS networks, the repeater 100 allows use of an alternate method for loading the LPRQSRCMAC register. Under this method, the repeater 100 remembers in LPRQS-RCMAC the IEEE source MAC address of the last probe-request packet that it received on the channel opposite to that on which the most recent beacon or probe-response frame was successfully received by the repeater 100.

For example, suppose that the repeater 100 most recently received a beacon or probe response on channel A, and that it transmitted the corresponding corrected beacon or probe-response frame on channel B. Then, LPRQSRCMAC will contain the source MAC address of the last probe-request packet that was received on channel B. If the destination MAC address test is enabled, the repeater 100 will send a future corrected probe-response frame only for destination MAC addresses that match LPRQSRCMAC. The current channel test works for both BSS and IBSS networks. Note that a repeater configured with the alternate destination MAC address test and the current channel test supports both BSS and IBSS operation simultaneously.

Medium Reservation for Corrected Beacon and Probe-Response Frames

As noted above, when the repeater 100 transmits an internally generated frame on channel A, 802.11 nodes on channel B are unable to detect such a transmission. As a result, it is possible that an 802.11 AP or Station will begin transmitting a frame on channel B during the repeater's transmission on A, so that this frame will never be heard by stations on channel B. This situation breaks the desired symmetry of channels A and B, under which both channels share the same collision domain.

Figure 7:
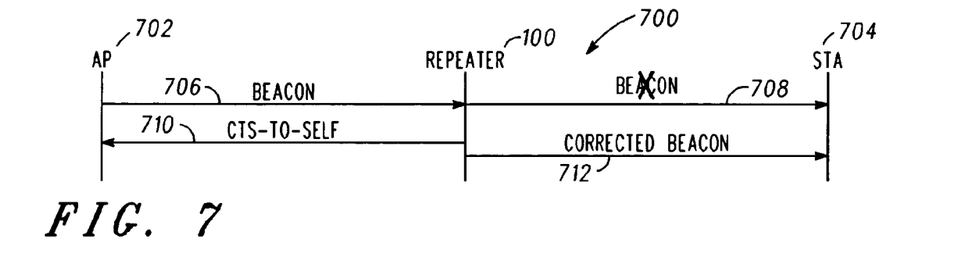
FIG. 7 is a packet sequence diagram illustrating the control message management features of the repeater of FIG. 1 operating in an 802.11 WLAN network relating to CTS-to-self with corrected beacon.
Figure 8:
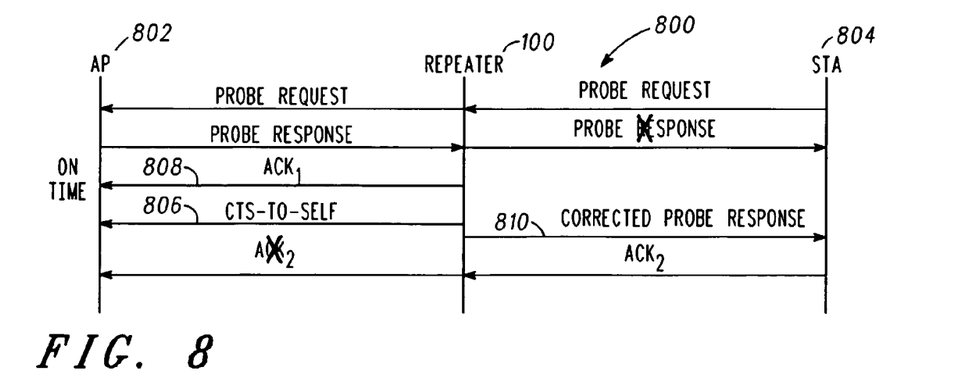
FIG. 8 is a packet sequence diagram illustrating the control message management features of the repeater of FIG. 1 operating in an 802.11 WLAN network relating to CTS-to-self with corrected probe response.

Referring to FIGS. 7 and 8, the repeater 100 is able to mitigate this problem by reserving the medium on channel A using a CTS-to-self frame, that is, a CTS frame transmitted by the repeater 100 and addressed to the repeater's own IEEE MAC address. For the beacon protocol, this situation is illustrated by the network 700 in FIG. 7. Specifically, when the repeater receives a beacon 706 transmitted by the AP 702, it does not forward the beacon as shown at 708 to the Station 704. Rather, it transmits an internally generated CTS-to-self frame at 710 to the AP 702 and transmits an internally generated corrected beacon at 712 to the Station 704.

In FIG. 8, for the probe-response protocol, a CTS-to-self frame is inserted at 806 between the probe-response ACK at 808 and the corrected probe-response at 810. Use of such CTS-to-self frames is optional. Similar comments apply to the analogous situation of an internally generated frame transmitted on channel B.

Referring again to FIGS. 7 and 8, although not specifically illustrated, a CTS-to-self frame may also be sent on the Station's channel by truncating the repeated beacon or probe-response and transmitting a CTS-to-self, on the Station's channel, shortly after the truncation point. In this situation, the CTS-to-self is being transmitted while the ending portion of the beacon or probe-response frame is still being received on the AP's channel. Scheduling of such overlapping CTS-to-self frames is controlled by an alternate set of clear-to-transmit parameters that may differ from those used to schedule other internally generated frames, such as corrected beacon and probe-response frames. Field testing suggests that overlapping CTS-to-self frames on the Station's channel are ignored by most 802.11 products on the market. Presently, it is believed best to begin transmission of an overlapping CTS-to-self frame slightly less than one distributed interframe spacing (DIFS) interval from the end of the truncated repeated transmission, and to reserve the medium for a period sufficient to cover the maximum-length beacon frame at 1 Mbps.

XOS Packet Reception and Transmission

Exemplary embodiments of the repeater 100, such as the aforementioned Xtender™ repeater, also can support reception and transmission of proprietary Xtender Operating System™ (XOS) management packets. XOS packets facilitate communications among multiple Xtenders™ and other XOS-aware APs or Stations.

According to one exemplary embodiment, the repeater 100 automatically acknowledges ALL probe-response messages from its affiliated AP, since by the time the repeater 100 has corrected and retransmitted the probe-response, the ACK to the probe-response from the Station has been delayed past the ACK timeout window (8-12 μs). In addition to the repeater 100 generating an ACK to the probe-response, the ACK from the Station is punctured on its way back to the AP to avoid confusion from the extra ACK. Because the repeater 100 generates an ACK for ALL probe-requests, collisions occur due to this ACK message on the AP channel when probe-responses are directed to a Station on the AP channel.

Given that both the repeater 100 and a Station are listening on the AP channel, both the Station in which the probe-response was directed and the repeater 100 will attempt to ACK the packet. Because these ACKs are not required to follow the clear channel assessment algorithms, both the Station and repeater 100 will transmit the ACKs at the same time (within 4 μs or so of each other) causing a collision of the ACK. Therefore, the AP would never receive a proper ACK for Probe Responses directed towards a Station on the AP channel. This causes the AP to continue to send the probe-response until it reaches its maximum number of retries. While some NIC drivers may simply ignore the extra probe-response packets, others have been seen to be very sensitive to any "abnormalities" in the MAC messaging.

To address the above noted problems, ACK responses can be filtered based on MAC address such that when a Probe Request has been received by the repeater 100 on the repeated channel, the MAC address of the transmitting Station would be stored by the repeater. Subsequently, only probe-responses received with a destination MAC which matches the MAC from the Probe Request would be acknowledged by the repeater 100.

In order to keep the implementation small, only a single MAC address from the last probe-request received would be stored However, if for example two different Stations send out a probe-request prior to the first probe-request being responded to by the AP, only the MAC address from the second probe-request would be stored. Probe-responses to the first probe-request would NOT be ACK'd by the repeater 100. In practice, this scenario seems to occur rarely. Therefore, the AP would send out several probe-response retries and the Station could send out another probe-request if so desired. More often what is seen is that a single Station will send out multiple probe-requests prior to receiving a probe-response, but in this case, the repeater 100 would ACK all probe-responses since they are to the same MAC address.

In addition, ACK responses can be filtered based on listening for other ACKs. When a probe-response has been received on the AP channel, the repeater 100 would begin listening to that channel for an ACK from the Station. If no ACK is detected within some amount of time, the repeater 100 would then generate the ACK for the probe-response. The ACK timeout window for DSSS packets is 8-12 μs. This means that a Station can begin the transmission of its ACK anytime that would cause its signal to be heard within that window. How long the repeater 100 would listen before generating its own ACK is not necessarily straight forward. If the distance between the repeater 100 and the AP is designated Dxa and the distance between the repeater 100 and the STA as Dxs, the detection time would need to be no longer than 12 μs—Dxa (ft)*0.001 μs in order for the repeater's ACK to fall in the timeout window. This means that if a Station delays more than this, the Station will usually collide with the repeater 100.

If for example the Station is 500 feet from the AP and 1000 feet from the repeater 100, the repeater 100 may not hear the ACK at all. However, the repeater 100 is close enough to the AP to cause a collision when the repeater 100 ACKs. Assuming that the repeater 100 hears the ACK, the repeater 100 would timeout within 11.5 μs to get the ACK out in time. Therefore, the Station would need to respond within 10.5 μs for the repeater 100 to hear the ACK in time not to transmit.

The invention is described herein in detail with particular reference to presently preferred embodiments. However, it will be understood that variations and modifications can be effected within the scope and spirit of the invention.

What is claimed is:

1. A repeater for use in a wireless local area network, comprising:

a transceiver for receiving a signal on a first frequency channel and for transmitting the signal on a second frequency channel different from the first frequency channel; and a control message modulator/demodulator (MODEM) coupled to the transceiver for demodulating a receive control message packet on the first frequency channel and for modulating one or more transmit control message packets that are transmitted by the transceiver on the first frequency channel in response to the receive control message packet, wherein the one or more transmit control message packets each include a first portion that corresponds to an unmodified version of the receive control message packet and a second portion that is modified from a corresponding portion of the receive control message packet by deliberately introducing error so as to reduce a likelihood that the one or more transmit control message packets will be successfully decoded at a receiver.

2. The repeater according to claim 1, wherein the second portion and not the first portion of the one or more transmit control message packets transmitted on the first frequency channel is punctured so as to reserve a medium associated with the first frequency channel.

3. The repeater according to claim 2, wherein the transceiver includes an amplifier for amplifying the receive control message packet, the amplifier having an associated gain that is adjustable to enable the one or more transmit control message packets to be punctured.

4. The repeater according to claim 2, further comprising an automatic gain control apparatus coupled to the transceiver that is adjustable to enable the one or more transmit control message packets transmitted on the first frequency channel to be punctured.

5. The repeater according to claim 2, wherein the repeater comprises a regenerative frequency translating physical layer repeater, wherein the one or more transmit control message packets transmitted on the first frequency channel are punctured in the digital domain so as to reserve a medium associated with the first frequency channel.

6. A method for selectively modifying messages in a frequency translating repeater based on a parameter of the messages, the method comprising:
searching for a preamble associated with a message received on a receive frequency channel;
decoding the received message if the preamble is detected;
generating a modified internal message that corresponds to a modified version of the received message; and
transmitting the modified internal message on both the receive frequency channel and a transmit frequency channel to prevent further activity on the receive frequency channel.

7. The method according to claim 6, further comprising puncturing a packet associated with the modified internal message transmitted on the receive frequency channel to reserve a medium associated with the receive frequency channel and to prevent further activity thereon.

8. The method according to claim 7, wherein the puncturing of a packet comprises puncturing a packet by downwardly adjusting a gain of the modified internal message transmitted on the receive frequency channel.

9. The method according to claim 7, wherein the puncturing of a packet comprises puncturing a packet by adjusting an automatic gain control associated with the modified internal message transmitted on the receive frequency channel.

10. A modulator/demodulator (MODEM) in a frequency translating repeater comprising:
a demodulator section for demodulating a received protocol message that is received on a first frequency channel; and
a modulator section for modulating a modified version of the received protocol message that includes a modified parameter for transmission on both the first frequency channel and a second frequency channel.

11. The MODEM according to claim 10, wherein the modified protocol message transmitted on the first frequency channel is punctured or truncated.

12. A physical layer repeater, comprising:
a transceiver for receiving a control message packet on a first frequency channel and for transmitting a modified version of the control message packet on a second frequency channel different from the first frequency channel; and
a modulator/demodulator (MODEM) coupled to the transceiver for demodulating the received control message packet on the first frequency channel and for modulating the modified version of the control message packet with an unmodified media access control (MAC) layer transmitted on the second frequency channel to achieve a network objective, wherein the modified version of the control message packet includes a first portion that corresponds to an unmodified version of the received control message packet and that includes the unmodified MAC layer, and a second portion that contains one or more modified header fields as compared to a corresponding portion from the received control message packet.

13. The physical layer repeater of claim 12, wherein the network objective comprises one of frequency translation of the modified control message packet from the first frequency channel to the second frequency channel, limiting access point (AP) connectivity and prioritizing client access.

14. The physical layer repeater of claim 12, wherein the physical layer repeater comprises one of a regenerative and a non-regenerative repeater.

15. An apparatus comprising:
a physical layer repeater configured to wirelessly repeat signals and to selectively generate and transmit control message packets between wireless stations on both a transmit side and a receive side and to manipulate an end to end protocol of the control message packets in a manner that does not change media access control (MAC) addresses of the end to end protocol to achieve a network objective, wherein the physical layer repeater is configured to manipulate the end to end protocol of the control message packets by modifying at least a portion and less than all of the control message packets by deliberately introducing error so as to reduce a likelihood that the modified control message packets will be successfully decoded for transmission to the receive side.

16. An apparatus comprising:
a wireless repeater configured to wirelessly repeat signals and to selectively generate and transmit control message packets at the wireless repeater between wireless stations on both a first communication segment and a second communication segment to ensure that a media access control (MAC) level protocol between the first and second communication segments functions properly, wherein the wireless repeater is configured to selectively modify at least a portion and less than all of the control message packets deliberately introducing error so as to reduce a likelihood that the modified control message packets will be successfully decoded for transmission upon the first communication segment and/or the second communication segment.

17. The repeater of claim 1, wherein the repeater comprises a physical layer repeater for disrupting the one or more transmit control message packets transmitted by the transceiver on the first frequency channel by one of puncturing or truncating the one or more transmit control message packets.

18. The repeater of claim 1, wherein the repeater comprises one of an analog, RF and digitally sampled repeater.

19. The repeater of claim 1, wherein the repeater comprises a regenerative repeater in which the MODEM modulates the one or more transmit control message packets with unmodified packet addressing.

20. A repeater for use in a wireless local area network, comprising:
  means for receiving a signal on a first frequency channel;
  means for transmitting the signal on a second frequency channel different from the first frequency channel; and
  means, coupled to the means for receiving and the means for transmitting, for demodulating a receive control message packet on the first frequency channel and for modulating one or more transmit control message packets that are transmitted by the means for transmitting on the first frequency channel in response to the receive control message packet, wherein the one or more transmit control message packets each include a first portion that corresponds to an unmodified version of the receive control message packet and a second portion that is modified from a corresponding portion of the receive control message packet by deliberately introducing error so as to reduce a likelihood that the one or more transmit control message packets will be successfully decoded at a receiver.

21. A modulator/demodulator (MODEM) in a frequency translating repeater comprising:
  means for demodulating a received protocol message that is received on a first frequency channel; and
  means for modulating a modified version of the received protocol message that includes a modified parameter for transmission on both the first frequency channel and a second frequency channel.

22. A physical layer repeater, comprising:
  means for receiving a control message packet on a first frequency channel;
  means for transmitting a modified version of the control message packet on a second frequency channel different from the first frequency channel; and
  means, coupled to the means for receiving and the means for transmitting, for demodulating the received control message packet on the first frequency channel and for modulating the modified version of the control message packet with an unmodified media access control (MAC) layer transmitted on the second frequency channel to achieve a network objective, wherein the modified version of the control message packet includes a first portion that corresponds to an unmodified version of the received control message packet and that includes the unmodified MAC layer, and a second portion that contains one or more modified header fields as compared to a corresponding portion from the received control message packet.

23. The method of claim 6, wherein the received message corresponds to a data packet.

24. The method of claim 23, wherein the modified version of the received message includes one or more modified fields in a header-portion as compared to the received message.

25. The method of claim 24, wherein the modified version of the received message includes a modified Timestamp field.

26. The MODEM of claim 10, wherein the received protocol message corresponds to a data packet.

27. The method of claim 26, wherein the modified version of the received protocol message includes one or more modified fields in a header-portion as compared to the received protocol message.

28. The method of claim 27, wherein the modified version of the received protocol message includes a modified Timestamp field.

29. The physical layer repeater of claim 12, wherein the received control message packet corresponds to a data packet.

30. The method of claim 29, wherein the modified version of the received control message packet includes a modified Timestamp field.

31. A non-transitory computer-readable medium containing instructions stored thereon, which, when executed by a repeater for use in a wireless local area network, cause the repeater to perform operations, the instructions comprising:
  program code to receive a signal on a first frequency channel;
  program code to transmit the signal on a second frequency channel different from the first frequency channel; and
  program code to demodulate a receive control message packet on the first frequency channel and to modulate one or more transmit control message packets on the first frequency channel in response to the receive control message packet, wherein the one or more transmit control message packets each include a first portion that corresponds to an unmodified version of the receive control message packet and a second portion that is modified from a corresponding portion of the receive control message packet by deliberately introducing error so as to reduce a likelihood that the one or more transmit control message packets will be successfully decoded at a receiver.

32. A non-transitory computer-readable medium containing instructions stored thereon, which, when executed by a modulator/demodulator (MODEM) in a frequency translating repeater, cause the MODEM to perform operations, the instructions comprising:
  program code to demodulate a received protocol message that is received on a first frequency channel; and
  program code to modulate a modified version of the received protocol message that includes a modified parameter for transmission on both the first frequency channel and a second frequency channel.

33. A non-transitory computer-readable medium containing instructions stored thereon, which, when executed by a physical layer repeater, cause the physical layer repeater to perform operations, the instructions comprising:
  program code to receiving a control message packet on a first frequency channel;
  program code to transmitting a modified version of the control message packet on a second frequency channel different from the first frequency channel; and
  program code to demodulate the received control message packet on the first frequency channel and to modulate the modified version of the control message packet with an unmodified media access control (MAC) layer transmitted on the second frequency channel to achieve a network objective, wherein the modified version of the control message packet includes a first portion that corresponds to an unmodified version of the received control message packet and that includes the unmodified MAC layer, and a second portion that contains one or more modified header fields as compared to a corresponding portion from the received control message packet.

34. A method of operating a repeater for use in a wireless local area network, comprising:
  receiving a signal on a first frequency channel;
  transmitting the signal on a second frequency channel different from the first frequency channel;
  demodulating a receive control message packet on the first frequency channel; and
  modulating one or more transmit control message packets on the first frequency channel in response to the receive control message packet, wherein the one or more transmit control message packets each include a first portion that corresponds to an unmodified version of the receive control message packet and a second portion that is modified from a corresponding portion of the receive control message packet by deliberately introducing error so as to reduce a likelihood that the one or more transmit control message packets will be successfully decoded at a receiver.

35. The method of claim 34, wherein the second portion is punctured or truncated to introduce the error.

36. A method of operating a repeater for use in a wireless local area network, comprising:
    receiving a signal on a first frequency channel;
    transmitting the signal on a second frequency channel different from the first frequency channel;
    demodulating a receive control message packet on the first frequency channel; and
    modulating one or more transmit control message packets on the second frequency channel in response to the receive control message packet,
    wherein the one or more transmit control message packets each include a first portion that corresponds to an unmodified version of the receive control message packet and a second portion that contains one or more modified header fields as compared to a corresponding portion from the receive transmit control message.

37. The method of claim 36, wherein the one or more modified header fields include a modified Current Channel field and/or a modified Timestamp field.

38. The method of claim 36, wherein the one or more modified header fields do not include a sequence number, source address or destination address.

39. The method of claim 34, wherein the first portion of the one or more transmit control message packets are modified such that receivers receiving the one or more transmit control message packets receive different data within the first portion of the one or more transmit control message packets as compared to the corresponding portion from the receive control message packet.

40. The method of claim 6, wherein deliberate error is added into the transmission of the modified internal message on the receive frequency channel to reduce a likelihood that the modified internal message will be successfully decoded by receivers monitoring the receive frequency channel.

41. The method of claim 6, wherein the modified internal message is transmitted on the receive frequency channel to improve reception of the modified internal message on the transmit frequency channel without achieving successful transmission of the modified internal message on the receive frequency channel.

42. A method of operating a modulator/demodulator (MODEM) in a frequency translating repeater comprising:
    demodulating a received protocol message that is received on a first frequency channel; and
    modulating a modified version of the received protocol message that includes a modified parameter for transmission on both the first frequency channel and a second frequency channel.

* * * * *